(12) United States Patent
Chauvier et al.

(10) Patent No.: US 8,958,687 B2
(45) Date of Patent: Feb. 17, 2015

(54) VIDEO TRICK MODE MECHANISM

(75) Inventors: Laurent Chauvier, Villeneuve-la-Guyard (FR); Aurélie Gauthier, Issy les Moulineaux (FR); Mohamed Yahyaoui, Paris (FR)

(73) Assignee: Cisco Technology Inc., San Jose, CA (US)

( * ) Notice: Subject to any disclaimer, the term of this patent is extended or adjusted under 35 U.S.C. 154(b) by 419 days.

(21) Appl. No.: 13/577,321

(22) PCT Filed: Feb. 2, 2011

(86) PCT No.: PCT/IB2011/050453
§ 371 (c)(1),
(2), (4) Date: Nov. 8, 2012

(87) PCT Pub. No.: WO2011/101762
PCT Pub. Date: Aug. 25, 2011

(65) Prior Publication Data
US 2013/0071095 A1    Mar. 21, 2013

(30) Foreign Application Priority Data
Feb. 16, 2010   (GB) .................................. 1002599.7

(51) Int. Cl.
*H04N 5/783* (2006.01)
*G06F 17/00* (2006.01)
(Continued)

(52) U.S. Cl.
CPC .............. *G11B 27/005* (2013.01); *G11B 27/34* (2013.01)
USPC ............ 386/343; 386/350; 715/244; 715/720

(58) Field of Classification Search
USPC .......... 386/343–357, 239–262; 715/243–244, 715/716–722
See application file for complete search history.

(56) References Cited

U.S. PATENT DOCUMENTS 5,867,229 A    2/1999   Stevens
7,194,701 B2   3/2007   Stavely et al.
(Continued)

FOREIGN PATENT DOCUMENTS

EP          0914638       8/1998
EP      001251515 A1     10/2002
(Continued)

OTHER PUBLICATIONS

PCT Search Report, dated Apr. 18, 2011, in corresponding International Application No. PCT/IB2011/050453 (9 pages).

*Primary Examiner* — Hung Dang
(74) *Attorney, Agent, or Firm* — Husch Blackwell LLP

(57) ABSTRACT

A system and method for video trick mode playback is described, the system and method including a user actuated control operative to slide (130) a playback position along a video file, the user actuated control including a rewind actuation, a forward actuation (120) and a default neutral actuation, a player device including a plurality of video file readers (110*b*-110*e*) operative to play the video frames at nominal frame rate disposed along the video file, around the playback position, the distance between the video file readers varying according to the sliding speed of the playback position, a trick play engine to control the sliding speed and direction of the playback position, the sliding speed and direction being functions of a user actuation and a trick play engine velocity, the position at which each one of the plurality of video file readers is disposed along the video file is updated to catch-up with the playback position when the playback position is not sliding forward at nominal frame rate according to predetermined rules.

13 Claims, 19 Drawing Sheets

(51) Int. Cl.
*G06F 17/20* (2006.01)
*G06F 17/21* (2006.01)
*G06F 17/22* (2006.01)
*G06F 17/24* (2006.01)
*G06F 17/25* (2006.01)
*G06F 17/26* (2006.01)
*G06F 17/27* (2006.01)
*G06F 17/28* (2006.01)
*G06F 3/00* (2006.01)
*G11B 27/00* (2006.01)
*G11B 27/34* (2006.01)

(56) References Cited

U.S. PATENT DOCUMENTS

| | | | |
|---|---|---|---|
| 7,496,277 | B2 | 2/2009 | Ackley et al. |
| 7,506,356 | B2 | 3/2009 | Gupta et al. |
| 8,705,943 | B2 * | 4/2014 | Cho .................... 386/282 |
| 2002/0039481 | A1 * | 4/2002 | Jun et al. .................. 386/68 |
| 2002/0075572 | A1 | 6/2002 | Boreczky et al. |
| 2002/0166122 | A1 | 11/2002 | Kikinis et al. |
| 2004/0045026 | A1 | 3/2004 | Baril et al. |
| 2005/0210388 | A1 * | 9/2005 | Matsumoto ............... 715/719 |
| 2007/0039032 | A1 | 2/2007 | Goldey et al. |
| 2007/0050837 | A1 | 3/2007 | Lopez-Estrada |
| 2007/0198111 | A1 | 8/2007 | Oetzel et al. |
| 2007/0260986 | A1 | 11/2007 | Cristofoli |
| 2008/0005128 | A1 | 1/2008 | Jayaraman et al. |
| 2008/0046406 | A1 | 2/2008 | Seide et al. |
| 2008/0062128 | A1 | 3/2008 | Brodersen et al. |
| 2008/0134095 | A1 | 6/2008 | Van Wyk et al. |
| 2008/0184120 | A1 | 7/2008 | OBrien-Strain et al. |
| 2008/0235583 | A1 | 9/2008 | Ostergaard et al. |
| 2008/0240672 | A1 * | 10/2008 | Ikeda et al. ................ 386/52 |
| 2009/0132921 | A1 | 5/2009 | Hwangbo et al. |
| 2009/0158326 | A1 | 6/2009 | Hunt et al. |
| 2010/0146392 | A1 * | 6/2010 | Duhig ..................... 715/719 |
| 2010/0262911 | A1 * | 10/2010 | Kaplan et al. ............. 715/719 |
| 2012/0057845 | A1 * | 3/2012 | Obana et al. ............. 386/241 |
| 2012/0141088 | A1 * | 6/2012 | Isozu et al. ............... 386/230 |

FOREIGN PATENT DOCUMENTS

| | | |
|---|---|---|
| EP | 002161722 A1 | 10/2010 |
| JP | 10108139 | 4/1998 |
| JP | 200138886 | 5/2000 |
| JP | 2007028128 A2 | 2/2007 |
| KR | 2093756 A | 12/2002 |
| WO | WO02/49354 A1 | 6/2002 |
| WO | WO2009082579 A2 | 7/2009 |

\* cited by examiner

FIG. 29 cont.

UPDATE THE POSITION AT WHICH EACH ONE OF THE PLURALITY OF VIDEO FILE READERS IS DISPOSED ALONG THE VIDEO FILE THEREBY CATCHING-UP WITH THE PLAYBACK POSITION WHEN THE PLAYBACK POSITION IS NOT SLIDING FORWARD AT NOMINAL FRAME RATE, AND ACCORDING TO THE FOLLOWING RULE: IF THE SLIDING SPEED IS GREATER THAN THE NOMINAL VIDEO FRAME RATE AND THE SLIDING DIRECTION IS FORWARD, THE POSITION OF THE MOST DELAYED VIDEO READING HEAD CHANGES TO MAKE IT THE MOST ADVANCED VIDEO READING HEAD, AND IF EITHER ONE OR BOTH OF ONE OF THE SLIDING SPEED IS LESS THAN THE NOMINAL VIDEO FRAME RATE, AND THE SLIDING DIRECTION IS REWIND, THE POSITION OF THE MOST ADVANCED VIDEO READING HEAD CHANGES TO MAKE IT THE MOST DELAYED VIDEO READING HEAD, WHEREIN: IN ONE OF A FORWARD OR REWIND ACTUATION OF THE USER ACTUATED CONTROL, THE SLIDING SPEED AND DIRECTION OF THE PLAYBACK POSITION ARE THE SAME AS THE VELOCITY SPEED COMPONENT AND DIRECTION COMPONENTS, IN A NEUTRAL ACTUATION OF THE USER ACTUATED CONTROL, IF THE VELOCITY SPEED COMPONENT IS GREATER THAN THE NOMINAL VIDEO FRAME RATE DURING ONE OF: FAST REWIND, AND FAST FORWARD, THEN THE SLIDING SPEED IS THE SAME AS THE NOMINAL VIDEO FRAME RATE AND THE SLIDING DIRECTION IS FORWARD AND IN A NEUTRAL ACTUATION OF THE USER ACTUATED CONTROL, IF THE VELOCITY SPEED COMPONENT IS LESS THAN THE NOMINAL VIDEO FRAME RATE DURING ONE OF: PAUSE, SLOW MOTION REWIND AND SLOW MOTION FORWARD, THEN THE SLIDING SPEED AND DIRECTION OF THE PLAYBACK POSITION ARE THE SAME AS THE VELOCITY SPEED COMPONENT AND DIRECTION COMPONENTS

VIDEO TRICK MODE MECHANISM

CROSS REFERENCE TO RELATED APPLICATIONS

The present application is a 35 USC §371 application of PCT/IB2011/050453, filed on Feb. 2, 2011 and entitled "VIDEO TRICK MODE MECHANISM", which was published in the English language with International Publication Number WO 2011/101762 A1, and which claims the priority of Great Britain Patent Application No. GB 1002599.7 of NDS Limited, filed Feb. 16, 2010, the content of all of which is incorporated herein by reference.

BACKGROUND OF THE INVENTION

The following references are believed to reflect the present state of the art:
U.S. Pat. No. 5,867,229 to Stevens;
U.S. Pat. No. 7,194,701 to Stavely, et al;
U.S. Pat. No. 7,496,277 to Ackley, et al;
U.S. Pat. No. 7,506,356 to Gupta, et al;
KR 2002-0093756 of Samsung Electronics Co. LTD.;
JP 2000138886 of NEC Corp;
US 2002/0075572 of Boreczky et al;
US 2007/0039302 of Goldey, et al;
US 2004/0045026 of Baril, et al;
US 2007/0050837 of Lopez-Estrada;
US 2007/0198111 of Oetzel, et al;
US 2007/0260986 of Cristofoli;
US 2008/0235583 of Ostergaard, et al;
US 2008/0062128 of Broderson, et al;
US 2008/0005128 of Jayaraman, et al;
US 2008/0046406 of Seide, et al;
US 2009/0132921 of Hwangbo, et al;
EP 0914638 and corresponding WO 98/34182 of Koninklijke Philips Electronics, N.V.;
EP 1251515 of Koninklijke Philips Electronics, N.V.;
EP 2161722 LG Electronics Inc.;
WO 2009/082579 on Netflix, Inc.; and
WO 02/49354 of Sony Corporation.

SUMMARY OF THE INVENTION

There is thus provided in accordance with an embodiment of the present invention a system for video trick mode playback, the system including a video file including a plurality of sequentially organized video frames a user actuated control operative to slide a playback position along the video file, the user actuated control including a rewind actuation, a forward actuation and a default neutral actuation a player device including a plurality of video file readers operative to play the video frames at nominal frame rate, the plurality of video file readers being disposed along the video file, around the playback position, the distance between the video file readers varying according to the sliding speed of the playback position a trick play engine to control the sliding speed and direction of the playback position, the sliding speed and direction being functions of a user actuation and a trick play engine velocity, the trick play engine velocity including a speed component and a direction component, and being, at least in part, a function of the user actuation each one of the plurality of video file readers simultaneously plays a different portion of the video file at a nominal video frame rate each one of the plurality of video file readers jumps closer to or further from its nearest neighboring ones of the plurality of video file readers as a function of the sliding speed the position at which each one of the plurality of video file readers is disposed along the video file is updated to catch-up with the playback position when the playback position is not sliding forward at nominal frame rate, and according to the following rule: if the sliding speed is greater than the nominal video frame rate and the sliding direction is forward, the position of the most delayed video reading head changes to make it the most advanced video reading head, and if either one or both of one of the sliding speed is less than the nominal video frame rate, and the sliding direction is rewind, the position of the most advanced video reading head changes to make it the most delayed video reading head, wherein: in one of a forward or rewind actuation of the user actuated control, the sliding speed and direction of the playback position are the same as the velocity speed component and direction components, in a neutral actuation of the user actuated control, if the velocity speed component is greater than the nominal video frame rate during one of: fast rewind, and fast forward, then the sliding speed is the same as the nominal video frame rate and the sliding direction is forward, and in a neutral actuation of the user actuated control, if the velocity speed component is less than the nominal video frame rate during one of: pause, slow motion rewind, and slow motion forward, then the sliding speed and direction of the playback position are the same as the velocity speed component and direction components.

Further in accordance with an embodiment of the present invention and also including a display upon which is displayed each of the different portions of the video file played by each one of the plurality of video file readers wherein different portions of the video file are displayed in separate windows such that the windows are displayed along the display in the same order as the positions of their associated video file readers along the video file, and the windows move along the screen like their associated video file readers move relatively to the sliding playback position in the video file.

Still further in accordance with an embodiment of the present invention the velocity corresponds to a vertical projection of a moving ball's position along a gravitational potential curve, the gravitational potential curve including a first dip corresponding to nominal video frame rate and a second dip including a video frame rate of zero frames per second, wherein the first dip corresponds to play mode and the second dip corresponds to pause mode.

Additionally in accordance with an embodiment of the present invention the gravitational potential curve further includes an alternative path bridging the second dip, thereby allowing the ball to avoid falling into the second dip, and fall, into the first dip instead, when the ball falls from a point of high gravimetric potential on the gravitational potential curve.

Moreover in accordance with an embodiment of the present invention a neutral actuation of the user actuated control results in the ball falling according to gravitational acceleration along the alternative path along the gravitational potential curve, if the velocity speed component is greater than the nominal video frame rate, and the direction component of the velocity includes a rewind direction.

Further in accordance with an embodiment of the present invention a neutral actuation of the user actuated control results in the ball falling according to gravitational acceleration along the gravitational potential curve.

Still further in accordance with an embodiment of the present invention when the user actuated control is actuated in one of a forward or rewind actuation along the direction in which the curve is rising, the ball is pushed and ascends in a non-linear progression along the curve.

Additionally in accordance with an embodiment of the present invention when the direction component of the velocity includes a forward direction and the velocity decelerates, a forward actuation of the user control accelerates the velocity.

Moreover in accordance with an embodiment of the present invention when the direction component of the velocity includes a rewind direction and the velocity decelerates, a rewind actuation of the user control accelerates the velocity.

Further in accordance with an embodiment of the present invention when the velocity speed component is greater than the nominal video frame rate, actuating the control in a direction opposite to the direction component of the velocity switches the direction component of the velocity to its opposite direction and disposes the ball on the corresponding position on the gravitational curve.

Still further in accordance with an embodiment of the present invention the nominal video frame rate is one of: 24 frames per second, and 30 frames per second.

There is also provided in accordance with another embodiment of the present invention a method for video trick mode playback, the method including providing a video file including a plurality of sequentially organized video frames sliding a playback position along the video file according to an actuation of a user actuated control, the user actuated control including a rewind actuation, a forward actuation and a default neutral actuation playing the video file at a player device, the player device including a plurality of video file readers operative to play the video frames at nominal frame rate, the plurality of video file readers being disposed along the video file, around the playback position, the distance between the video file readers varying according to the sliding speed of the playback position controlling the sliding speed and direction of the playback position at a trick play engine, the sliding speed and direction being functions of a user actuation and a trick play engine velocity, the trick play engine velocity including a speed component and a direction component, and being, at least in part, a function of the user actuation simultaneously playing a different portion of the video file at a nominal video frame rate at each one of the plurality of video file readers jumping each one of the plurality of video file readers closer to or further from its nearest neighboring ones of the plurality of video file readers as a function of the sliding speed updating the position at which each one of the plurality of video file readers is disposed along the video file thereby catching-up with the playback position when the playback position is not sliding forward at nominal frame rate, and according to the following rule if the sliding speed is greater than the nominal video frame rate and the sliding direction is forward, the position of the most delayed video reading head changes to make it the most advanced video reading head, and if either one or both of one of the sliding speed is less than the nominal video frame rate, and the sliding direction is rewind, the position of the most advanced video reading head changes to make it the most delayed video reading head, wherein in one of a forward or rewind actuation of the user actuated control, the sliding speed and direction of the playback position are the same as the velocity speed component and direction components, in a neutral actuation of the user actuated control, if the velocity speed component is greater than the nominal video frame rate during one of: fast rewind, and fast forward, then the sliding speed is the same as the nominal video frame rate and the sliding direction is forward, and in a neutral actuation of the user actuated control, if the velocity speed component is less than the nominal video frame rate during one of: pause, slow motion rewind, and slow motion forward, then the sliding speed and direction of the playback position are the same as the velocity speed component and direction components.

There is also provided in accordance with still another embodiment of the present invention a method for trick mode playback, the method including providing a video file, the video file including a plurality of sequentially organized video frames, in response to a user initiation of trick mode playback determining a theoretical position in the video file, the theoretical position being determined by selecting a frame last displayed in one of Play mode or Pause mode, and moving to one of a next frame or a previous frame according to a speed of the trick mode playback, and a video speed (frames per second) at a time when trick mode playback is terminated, selecting, from among the plurality of sequentially organized video frames, at least two video frames, a first of the at least two video frames including a video frame positioned prior to the theoretical position in the video file, and a second of the at least two video frames including a video frame positioned after the theoretical position in the video file, performing one of advancing and reversing the theoretical position according to trick mode playback speed and direction, and in response to a user cessation of trick mode playback, performing one of the following displaying, in Play mode, the video stream beginning at the theoretical position, and pausing the displaying of the video stream in response to entering Pause mode, wherein the user initiation of trick mode playback includes a user actuation of one of a first directional oriented control or a second directional oriented control on a user interface device.

Further in accordance with an embodiment of the present invention the method further including displaying, in a trick mode playback display, as a first video timeline, the theoretical position, wherein the displaying as a first video timeline occurs after the step of determining a theoretical position in the video file, and before the step of selecting, from among the plurality of sequentially organized video frames, at least two video frames.

Still further in accordance with an embodiment of the present invention the method further including at least one of displaying, in the trick mode playback display, as a second video timeline, a first thumbnail video file corresponding to the first of the at least two video frames, the first thumbnail video file being displayed to the left of the theoretical position, and displaying, in the trick mode playback display, as a third video timeline, a second thumbnail video file corresponding to the second of the at least two video frames, the second thumbnail video file being displayed to the right of the theoretical position, wherein either or both of the steps of displaying as a second video timeline or displaying as a second video timeline occur after the step of selecting, from among the plurality of sequentially organized video frames, at least two video frames and before the step of performing one of advancing and reversing the theoretical position.

Additionally in accordance with an embodiment of the present invention the method further including displaying a new first thumbnail video file and a new second thumbnail video file in response to the one of advancing and reversing the theoretical position, wherein the displaying in response to the one of advancing and reversing the theoretical position occurs after the step of performing one of advancing and reversing the theoretical position and before one of the steps of displaying, in Play mode, the video stream beginning at the theoretical position, and pausing the displaying of the video stream in response to entering Pause mode.

Moreover in accordance with an embodiment of the present invention the speed of the trick mode playback is determined, at least in part, by a duration of the user actuation.

Further in accordance with an embodiment of the present invention the speed of the trick mode playback is determined, at least in part, by a gravitational potential curve.

Still further in accordance with an embodiment of the present invention a rate of acceleration of the trick mode playback is determined, at least in part, by a duration of the user actuation.

Additionally in accordance with an embodiment of the present invention the distance of each of the at least two video frames in the sequentially organized video frames from the theoretical position, is dependent, at least in part, on the duration of the user actuation.

There is also provided in accordance with still another embodiment of the present invention a system for trick mode playback, the method including a video file, the video file including a plurality of sequentially organized video frames, a processor, which, in response to a user initiation of trick mode playback determines a theoretical position in the video file, the theoretical position being determined by a first frame selector which selects a frame last displayed in one of Play mode or Pause mode, and moving to one of a next frame or a previous frame according to a speed of the trick mode playback, and a video speedometer, which determines a video speed (frames per second) at a time when trick mode playback is terminated, a second frame selector which selects, from among the plurality of sequentially organized video frames, at least two video frames, a first of the at least two video frames including a video frame positioned prior to the theoretical position in the video file, and a second of the at least two video frames including a video frame positioned after the theoretical position in the video file, a video processor which performs one of advancing and reversing the theoretical position according to trick mode playback speed and direction, and a video displayer which, in response to a user cessation of trick mode playback, displays, in Play mode, the video stream beginning at the theoretical position, and a video pauser which in response to a user cessation of trick mode playback, pauses the displaying of the video stream in response to entering Pause mode, wherein the user initiation of trick mode playback includes a user actuation of one of a first directional oriented control or a second directional oriented control on a user interface device.

BRIEF DESCRIPTION OF THE DRAWINGS

The present invention will be understood and appreciated more fully from the following detailed description, taken in conjunction with the drawings in which like elements are given like reference numerals, and in which.

DETAILED DESCRIPTION OF AN EMBODIMENT

Figure 1:
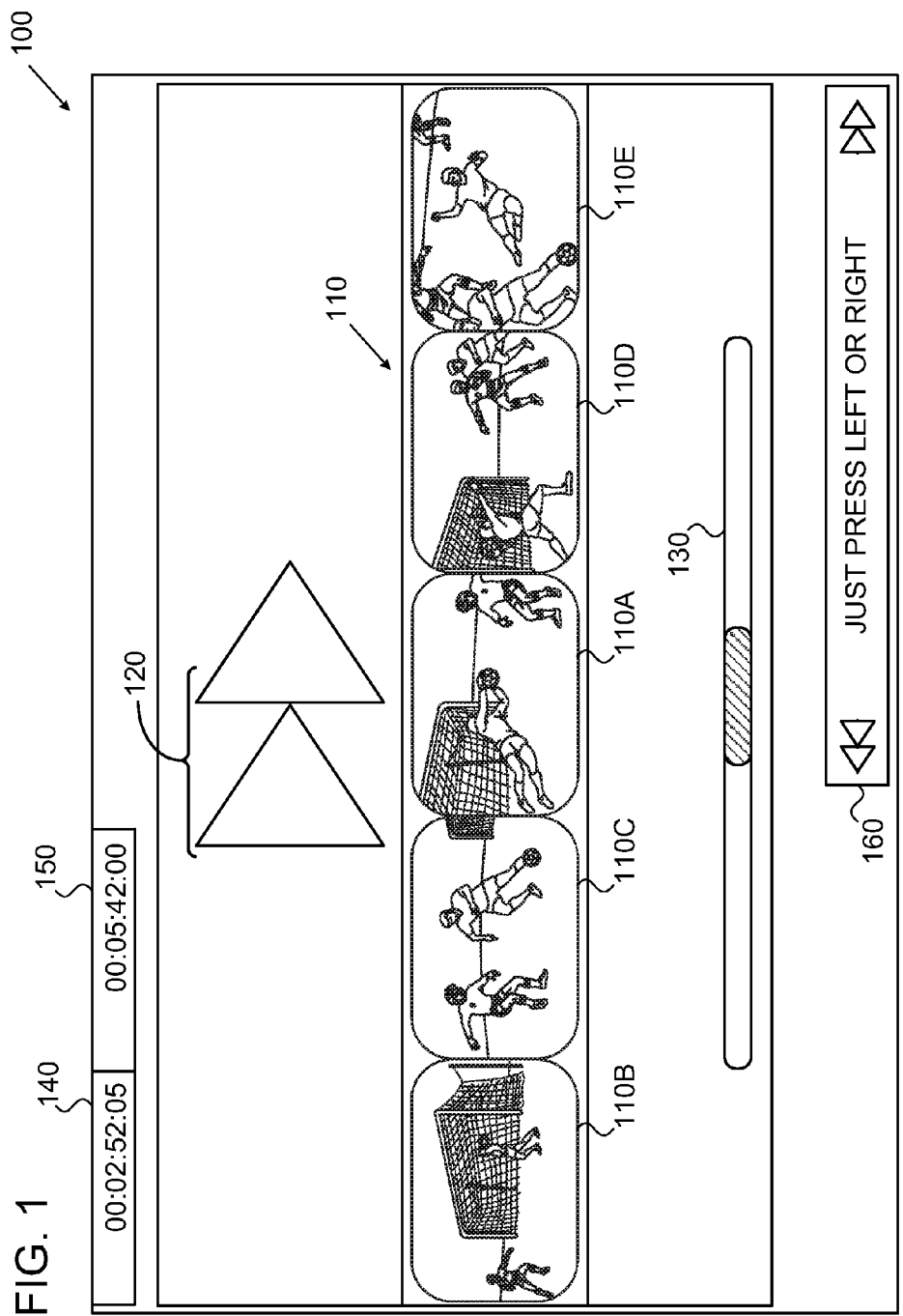
FIG. 1 is a simplified pictorial illustration of a user interface for a video trick mode display constructed and operative in accordance with an embodiment of the present invention.

Reference is now made to FIG. 1, which is a simplified pictorial illustration of a user interface 100 for a video trick mode display constructed and operative in accordance with an embodiment of the present invention. The system of FIG. 1 is typically resident on a device which is operative to display video, for example and without limiting the generality of the foregoing, a computer, a cell phone, an MP4 player, a DVD player, a PVR or DVR, and a set top box. The components of the system of FIG. 1 are described below with reference to FIG. 2.

FIG. 1 is now described. A video display 110 comprising a multiplicity of video frames 110a, 110b, 110c, 110d, 110e is displayed on the user interface 100. Each of the video frames 110a, 110b, 110c, 110d, 110e corresponds to a video frame in one video file. It is appreciated that although the video display 110 is depicted displaying five video frames 110a, 110b, 110c, 110d, 110e, other numbers of video frames, such as three, four, or six video frames may be displayed in the video display 110. A double arrowhead 120 (▶▶) is depicted on top of the video display 110, indicating that the video display 110 is being fast forwarded.

A bar 130, similar to slide bars known in the art, is depicted indicating the position of the multiplicity of video frames 110a, 110b, 110c, 110d, 110e in the video file displayed in the video display 110.

Also depicted in FIG. 1 are an indication of the present time 140 in a video time line and an indication of the total time 150 in the video. That is to say, in the example depicted in FIG. 1, the present position in the video time line is 2:52:05 hours out of a total 5:42:00 hours of video have been displayed. Additionally, an instruction legend 160, reading, "◀◀ JUST PRESS LEFT OR RIGHT ▶▶ " is depicted in FIG. 1. Actuating one of a first directional oriented control or a second directional oriented control, for example, and without limiting the generality of the foregoing, a left oriented control or a right oriented control on a user interface device, such as, but not limited to a remote control, a joy stick, or cell phone, starts a process of video trick mode fast forwarding or rewinding. Ceasing the actuating of one of the first directional oriented control or the second directional oriented control on the user interface device will result in either one of:

displaying, in Play mode, the video stream; and
pausing the of the video stream.

It is appreciated that the actuating of one of the first directional oriented control or the second directional oriented control may comprise one of pressing a left arrow key or a right arrow key on a remote control device. As such, any reference in the present specification and claims of pressing keys on a remote control device are to be understood in a more general sense of actuating of one of the first directional oriented control or the second directional oriented control.

The ability to render video at speeds other than normal speeds is known in the art as "trick modes". Typically, in prior art systems, a trick mode is executed by displaying one single video frame at one time on a video display. Typically, trick modes are executed in one of two fashions:

Smooth trick modes—the playback device sends all video frames of the playback in the recorded file to a video decoder. The frames are sent at a higher than normal speed. The video decoder may either:
 (a) Decode all the frames—but drop some of the frames, since a video display such as a TV set can usually render only 25 or 30 frames per second, and a high definition TV set can usually render 50-60 frames per second, and in a smooth trick mode the number of frames decoded per second is typically higher than the number of frame that can be displayed on the TV set.
 (b) Decode selected frames—Drop B-frames or P-frames as needed to keep up with the speed.
 (c) Combine methods (a) and (b)

Those skilled in the art will appreciate that smooth trick modes incur a performance requirement both on the play back device hard drive and the video decoder. Thus, smooth trick modes are typically used only for low fast-forward and rewind speeds.

Scan trick modes—only selected frames from the playback are sent to the video decoder. Sending only selected frames to the video decoder typically entails:
 (1) selecting a key-frame to be sent to the video decoder and rendering the key-frame;
 (2) pausing a certain period of time;
 (3) jumping in the recording a distance corresponding to the speed at which the user is viewing (for instance, ×30 ("times 30") trick mode will jump a certain distance in the recording, while ×50 ("times 50") trick mode will jump farther in the recording); and
 (4) repeating step 1.

In scan trick modes, typically, there is a noticeable pause between the frames presented, as the frames usually comprise frames from different scenes, and a user's eye needs to adjust to the change of scenes.

Of the two types of trick modes, smooth trick modes are typically preferred as smooth trick modes have a pleasing visual affect. However, smooth trick modes are only used for low-speed trick modes, since video decoders and/or hard drives cannot perform quickly enough to process all of the frames to be rendered.

Figure 2:
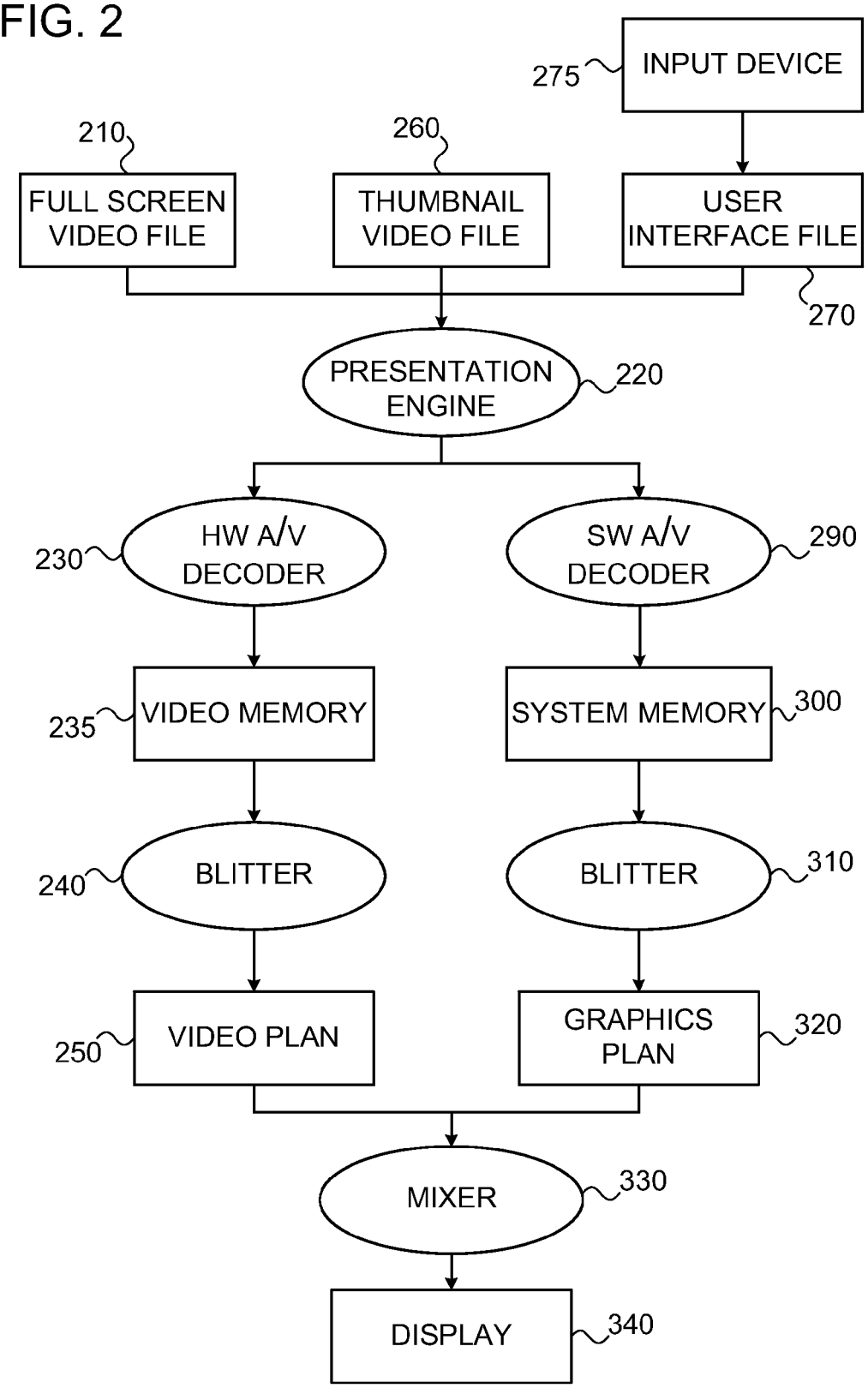
FIG. 2 is a block diagram of an embodiment for displaying video in trick mode in the system of FIG. 1.

Reference is now made to FIG. 2. FIG. 2 is a block diagram of an embodiment for displaying video in trick mode in the system of FIG. 1.

A full screen video file 210 is provided to the device on which the video file 210 is to be played on. The full screen video file 210 comprises video components, audio components, and other components which are well known in the art (such as, for example, and without limiting the generality of the foregoing, metadata components) which have been adapted to a screen of an appropriate size of for the device. The full screen video file 210 is typically encoded in standard video transport stream format, as is well known in the art, using standard video and audio codecs, such as the MPEG-2 encoding, H.264 encoding, VC-1 encoding, and synthetic encodings such as Scalable Vector Graphics (SVG) and LASER (ISO/IEC 14496-20), and so forth.

The full screen video file 210 is decoded by a hardware decoder process, hereinafter referred to as a presentation engine 220. It is appreciated that in FIG. 2 processes are depicted as ovals. The decoded video output by the presentation engine 220 is input into a hardware audio/visual decoder 230. Output from the hardware audio/visual decoder 230 is stored in a stored in a video memory 235. The decoded video is then copied, with or without transformations by a blitter (BLock Image Transfer) process 240 into a video memory plan 250. The video memory plan 250 is described in greater detail below with reference to FIG. 3. Those skilled in the art will appreciate that the transformations referred to above refers to the potential to transform video by copying the video to different sizes and positions. It is appreciated that, in alternative embodiments of the present invention, the full screen video file 210 will be decoded in a software decoder process.

A thumbnail source video file 260 is provided to the device. The way in which the thumbnail source video file 260 is constructed and distributed depends on the embodiment of the present invention. In one embodiment of the present invention, the thumbnail source video file 260 accompanies the full screen video file 210, assuming they are both constructed and distributed in the same way and by the same provider. Alternatively, in another embodiment, the thumbnail source video file 260 is created in advance by a dedicated component of a distribution platform. In still another embodiment of the present invention, the display device transcodes the original full screen video file 210 in order to create the thumbnail source video file 260.

The thumbnail source video file 260 comprises thumbnail versions of video frames located in the full video file 210, as is known in the art. When trick mode playback is initiated by a viewer of the full screen video file 210, as will be explained below, the multiplicity of video frames 110*a*, 110*b*, 110*c*, 110*d*, 110*e* (FIG. 1) is displayed on the video display 110 (FIG. 1). Each of the video frames 110*a*, 110*b*, 110*c*, 110*d*, 110*e* corresponds to a video frame in the thumbnail source video file 260. The thumbnail source video file 260 comprises video components, audio components and other components (such as, but not limited to metadata components), including pointers to frames in the full screen video file 210 corresponding to thumbnail video frames in the thumbnail source video file 260. The pointers are used to direct transfer from thumbnail frames to corresponding appropriate frames in the full screen video file 210 when going from a trick mode to one of play or pause.

As described above with reference to the full screen video file 210, the thumbnail source video file 260 is encoded using standard video and audio codecs, such as the MPEG-2 encoding, H.264 encoding, VC-1 encoding, and synthetic encodings such as Scalable Vector Graphics (SVG) and LASER (ISO/IEC 14496-20), and so forth. The encoding of the thumbnail source video file 260, however, in contrast to the full screen video file 210, is however, optimized for decoding by a software decoder process 290. It is appreciated that, in spite of the thumbnail source video file 260 having been optimized for decoding by the software decoder process 290, it is possible that the thumbnail source video file 260 will be decoded in hardware.

A user interface file 270 is resident on the device and comprises a graphical description of a trick mode displaying application, such as, but not limited to the user interface 100 (FIG. 1) for a video trick mode depicted in FIG. 1. The user interface file 270 also comprises machine executable code for the trick mode displaying application. Both the thumbnail source video file 260 and the user interface file 270 are in communication with and controlled by the presentation engine 220. The user interface file 270 is invoked by an input from a user interface device 275, such as, actuation of one of the first directional oriented control or the second directional oriented control, as described above. The presentation engine 220 is a process which ensures that the correct elements from the user interface file 270, the correct thumbnails from the thumbnail video file 260 or the full screen video 210 is displayed at the correct time according to the present trick mode controlled by the user and a present position and speed of navigation in the video file.

When one of the thumbnails comprised in the thumbnail source video file 260 is needed in order to display one or more of the multiplicity of video frames 110*a*, 110*b*, 110*c*, 110*d*, 110*e* (FIG. 1), the presentation engine 220 selects one or more of the appropriate thumbnails and sends the one or more of the appropriate thumbnails to the software decoder process 290. Output of the software decoder process 290 is stored in system memory 300. The process by which the one or more of the multiplicity of video frames 110*a*, 110*b*, 110*c*, 110*d*, 110*e* is selected is described below in greater detail.

When trick mode playback is initiated by the viewer, the presentation engine 220 calls, executes, and renders the trick mode application into the system memory 300. The contents of the system memory 300 are copied, by a second blitter process 310 into a graphics memory plan 320. The graphics memory plan 320 is described below with reference to FIG. 3. The contents of the video memory plan 250 and the graphics memory plan 320 are mixed and blended by a video/graphic mixing process 330 onto a video display 340 comprised on the device (such as, but not limited to the video display 110 of FIG. 1).

Figure 3:
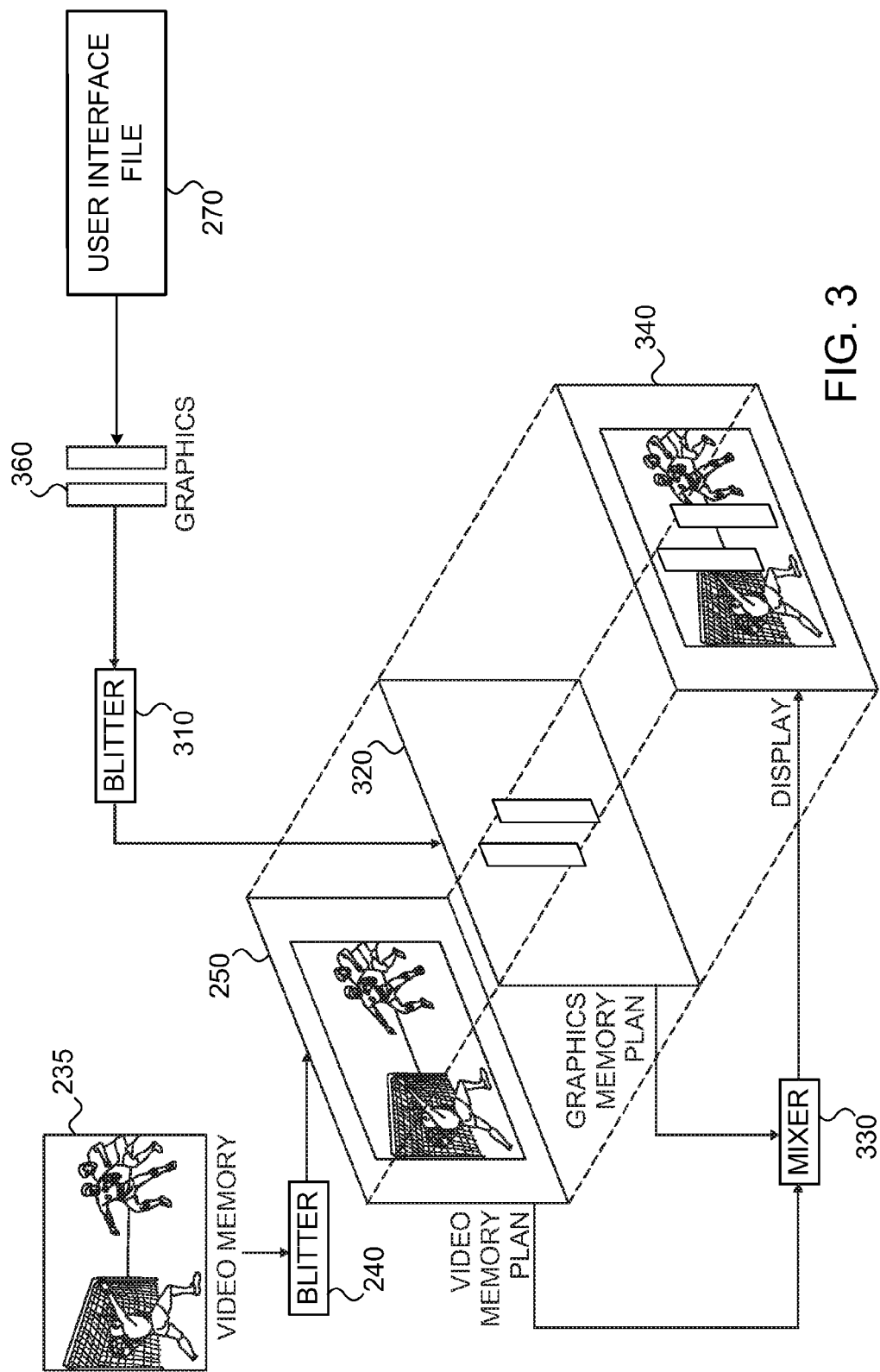
FIG. 3 is a partially block diagram partially pictorial diagram of the interaction between the graphic plan and the video plan of FIG. 2.

Reference is now made to FIG. 3, which is a partially block diagram partially pictorial diagram of the interaction between the graphic plan and the video plan of FIG. 2. As was explained above, the decoded video output is stored in a video memory 235, and is copied by a blitter 240 as a bitmap image corresponding to the full screen of the output display into the video memory plan 250. The video memory 235 and the video memory plan 240 are depicted for illustrative purposes in FIG. 3 with a pictorial representation of a video image.

A bitmap graphical image 360 is derived from the user interface file 270 and is stored in the graphics memory plan 320 as a bitmap corresponding to the full screen of the output display too. Both the graphics plan 320 and the video plan 250 are mixed, like two layers one above the other, by the mixer 330 to create the final display 340 with the graphical image superimposed on the video image.

Reference is now made to FIGS. 4-8 which are partially cartoon-like partially pictorial illustrations which use various metaphors in order to provide a figurative overview of typical use cases and links between concepts, data, and behaviors in the operation of the system of FIG. 1. It is appreciated that all of the examples in FIGS. 4-8 might refer specifically to one of fast forward or fast rewind trick mode. Nevertheless, such examples are given as a matter of convenience, and any example applies equally to trick mode play in either direction. It is also the case that any references to one of either fast forward or fast rewind trick mode in the specification and claims herein is by way of example and not meant to be limiting to only that particular direction of trick mode play.

Figure 4:
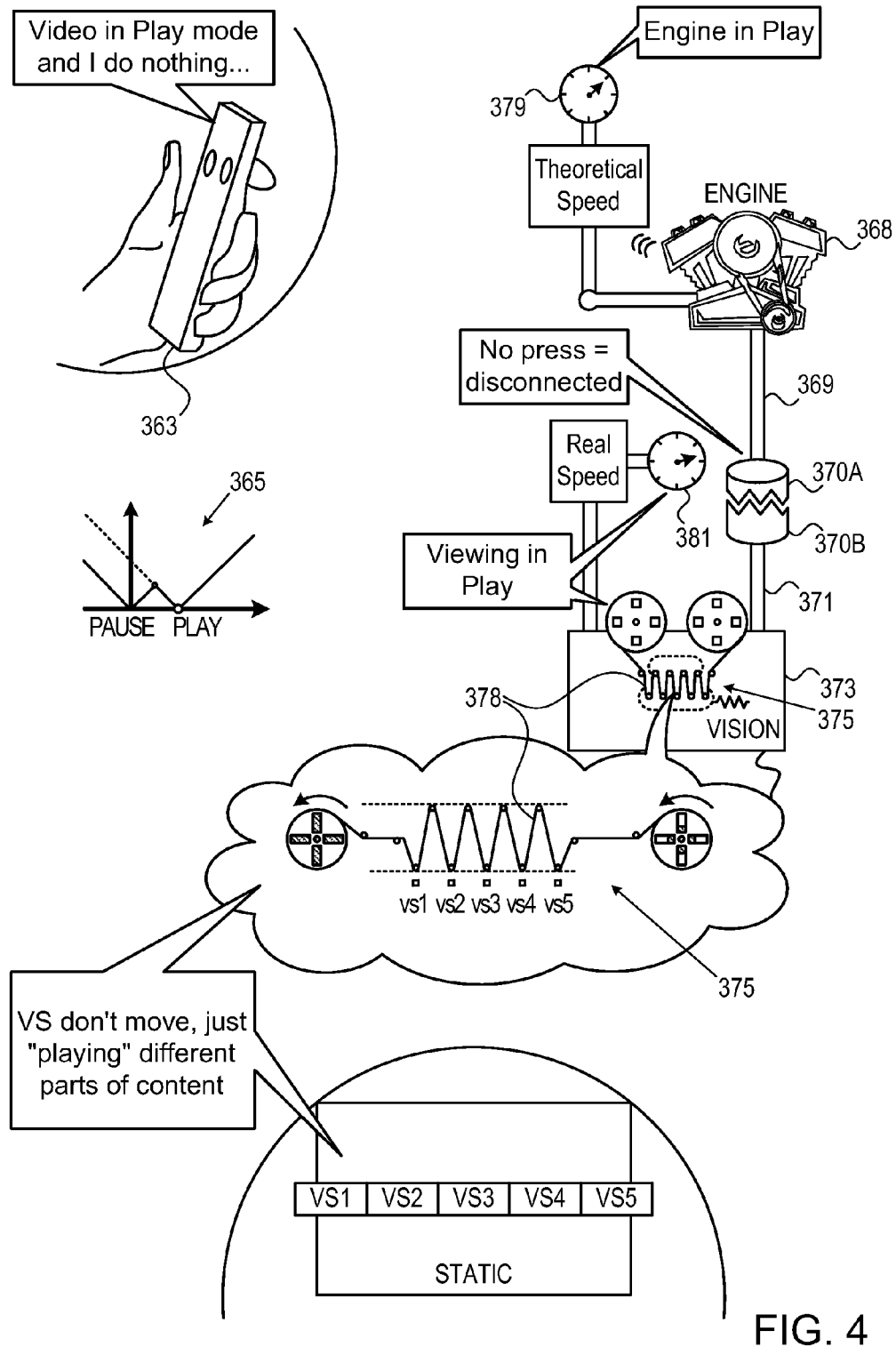
FIGS. 4-8 are partially cartoon-like partially pictorial illustrations which use various metaphors in order to provide a figurative overview of typical use cases and links between concepts, data, and behaviors in the operation of the system of FIG. 1.

Turning specifically to FIG. 4, a user of the system of FIG. 1 is holding a remote control 363. The user is viewing a video in play mode, and as such, the user takes no action.

A detail of a potential curve 365 is depicted, detailing how the video file being viewed can be modeled as if the video file were a ball moving on a gravitational potential curve. The role of the potential curve in various embodiments of the present invention is introduced below, with reference to FIGS. 9 and 10.

A trick play "engine" 368 is depicted, metaphorically representing the engine which operates the trick play. The engine 368 is depicted as turning a shaft 369. The shaft 369 is attached to an interlocking gear mechanism 370A and 370B. Since the depiction in FIG. 4 is of the system of FIG. 1 in play mode, the trick play the trick play "engine" 368 is depicted having the interlocking gears 370A and 370B disengaged. The trick play "engine" 368 is operative to control a sliding speed and direction of a playback position, the sliding speed and direction being functions of a user actuation and a trick play engine velocity, the trick play engine velocity comprising a speed component and a direction component, and being, at least in part, a function of the user actuation.

The interlocking gear mechanism 370A and 370B is depicted as being attached to a second shaft 371, shaft entering into, and metaphorically controlling the motion of a "projection unit" 373. Since the interlocking gears 370A and 370B are disengaged, the rate at which the trick play engine 368 turns shaft 369 has no effect on the video playback speed, as explained below.

The projection unit 373 comprises a symbolic reel-to-reel projector 375. The reel-to-reel projector 375 is symbolically depicted with a sinusoid curve 378 between the two reels. The sinusoid curve 378 is labeled as having, at its troughs, VS1 (video stream 1), VS2 (video stream 2), . . . , VS5 (video stream 5). Different video streams (VS1, VS2, . . . , VS5) correspond to the different frames among the multiplicity of video frames 110*a*, 110*b*, 110*c*, 110*d*, 110*e* (FIG. 1) displayed on the user interface 100 (FIG. 1).

The reel-to-reel projector 375 corresponds to a plurality of video file readers operative to play the video frames at nominal frame rate, the plurality of video file readers being disposed along the video file, around the playback position, the distance between the video file readers varying according to the sliding speed of the playback position.

Each one of the plurality of video file readers simultaneously plays a different portion of the video file at a nominal video frame rate. Each one of the plurality of video file readers jumps closer to or further from its nearest neighboring ones of the plurality of video file readers as a function of the sliding speed. The position at which each one of the plurality of video file readers is disposed along the video file is updated to catch-up with the playback position when the playback position is not sliding forward at nominal frame rate, and according to the following rule:

if the sliding speed is greater than the nominal video frame rate and the sliding direction is forward, the position of the most delayed video reading head changes to make it the most advanced video reading head; and if either one or both of one of the sliding speed is less than the nominal video frame rate; and the sliding direction is rewind, the position of the most advanced video reading head changes to make it the most delayed video reading head.

Because the interlocking gears 370A and 370B are disengaged, there is no effect of the trick play engine 368 on the video playback speed. The speed at which VS1, VS2, . . . , VS5, progress is the "regular" video playback speed (1×). It will be noted that the engine 368 is depicted as comprising a speedometer 379 which shows the theoretical speed of the video. Likewise, the projection unit 373 is depicted comprising a second speedometer 381, which indicates the playback speed. In the present example, the playback speed is the same as the theoretical speed.

As the gears 370A, 370B turn at regular video playback speed, the speed of the additional video streams VS1, VS2, . . . , VS5, is "static". That is to say, the additional video streams VS1, VS2, . . . , VS5 progress at regular video playback speed without any trick mode playback.

Figure 5:
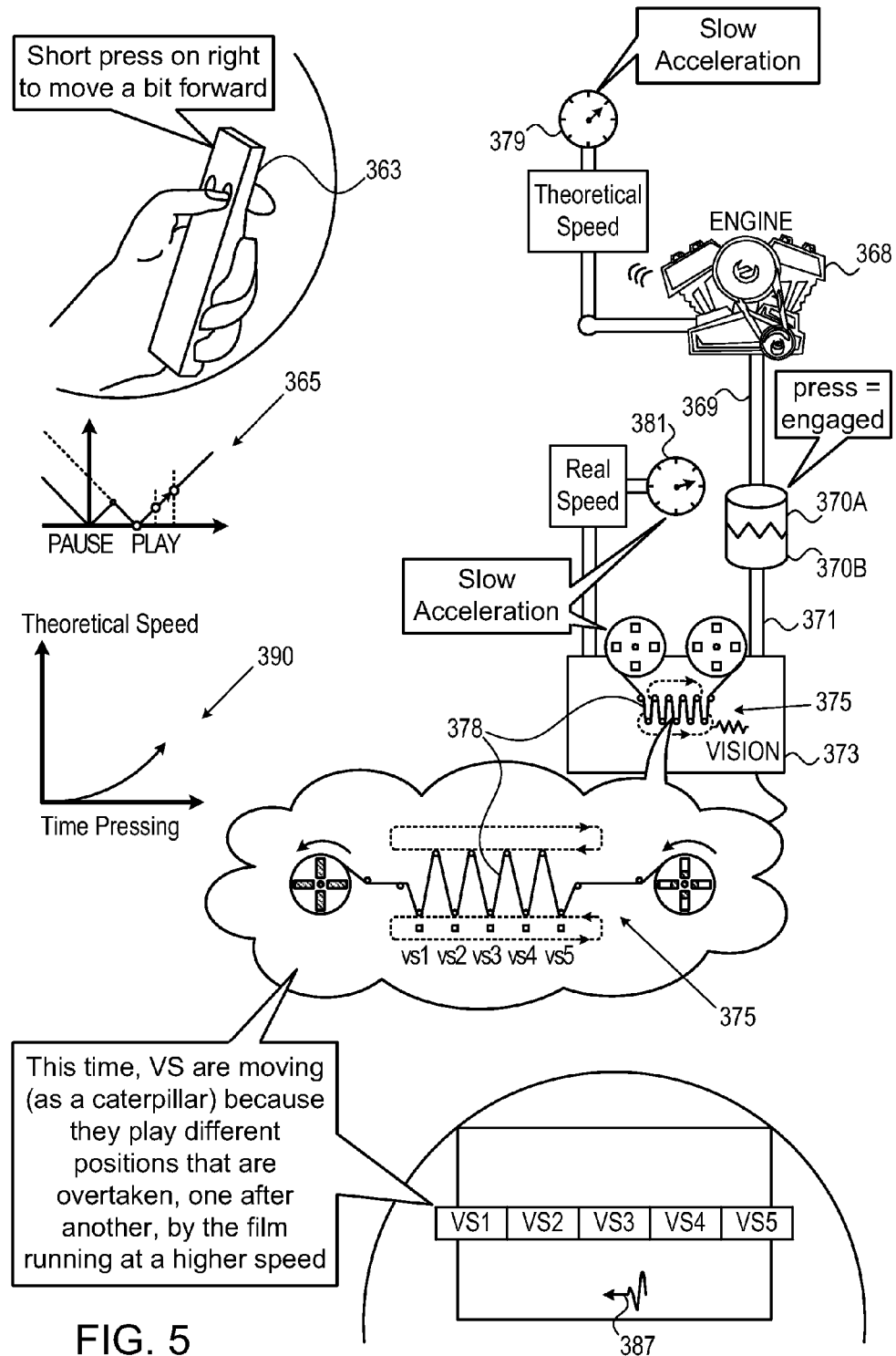

Turning specifically to FIG. 5, the user holding the remote control 363 is depicted pressing on the right oriented control. It is noted that in the metaphoric depiction of FIG. 5, the press on the right oriented control is a short press. The effect of the short press on the right oriented control is to move the video a bit forward.

A detail of a potential curve 365 is depicted, detailing how the video file being viewed can be modeled as if the video file were a ball moving on a gravitational potential curve. The behavior of the potential curve during fast forward is described below, with reference to FIG. 19.

The trick play engine 368 is depicted in FIG. 5 as turning a shaft 369. Shaft 369 is attached to the interlocking gear mechanism 370A and 370B. By contrast with FIG. 4, the depiction in FIG. 5 is of the system of FIG. 1 in "slow fast forward trick play" mode. Thus, the trick play the trick play "engine" 368 is depicted having the interlocking gears 370A and 370B engaged.

Since the interlocking gears 370A and 370B are now engaged, the rate at which the trick play engine 368 turns shaft 369 has an effect on the video playback speed, as explained below.

The sinusoid curve 378 is now depicted in a state where the various video streams VS1, VS2, . . . , VS5 are moving, albeit slowly ("like a caterpillar"), because the various video streams VS1, VS2, . . . , VS5 are playing different positions in the video file. The different positions played in VS1, VS2, . . . , VS5 are overtaken, one by one, because the video is effectively running at a higher speed. Accordingly, the trick play engine 368 speedometer 379 and the projection unit 373 speedometer 381 are both depicted indicating slow acceleration of video speed.

As the gears 370A, 370B are now turn at a slowly accelerating video playback speed, the speed of the video streams VS1, VS2, . . . , VS5, is indicated with a curve 387 indicating that the positions of VS1, VS2, . . . , VS5 are slowly accelerating. Curves of the shape of curve 387 are used throughout the figures in order to indicate that a video associated with the curve of the shape of curve 387 is moving smoothly in the direction of video play.

A hysteresis graph 390 depicting the relationship between the theoretical speed of the video streams VS1, VS2, . . . , VS5 and the time engaged in pressing the right oriented control of the remote control 363. The hysteresis graph 390 is explained below in greater detail with reference to FIGS. 15-18.

Figure 6:
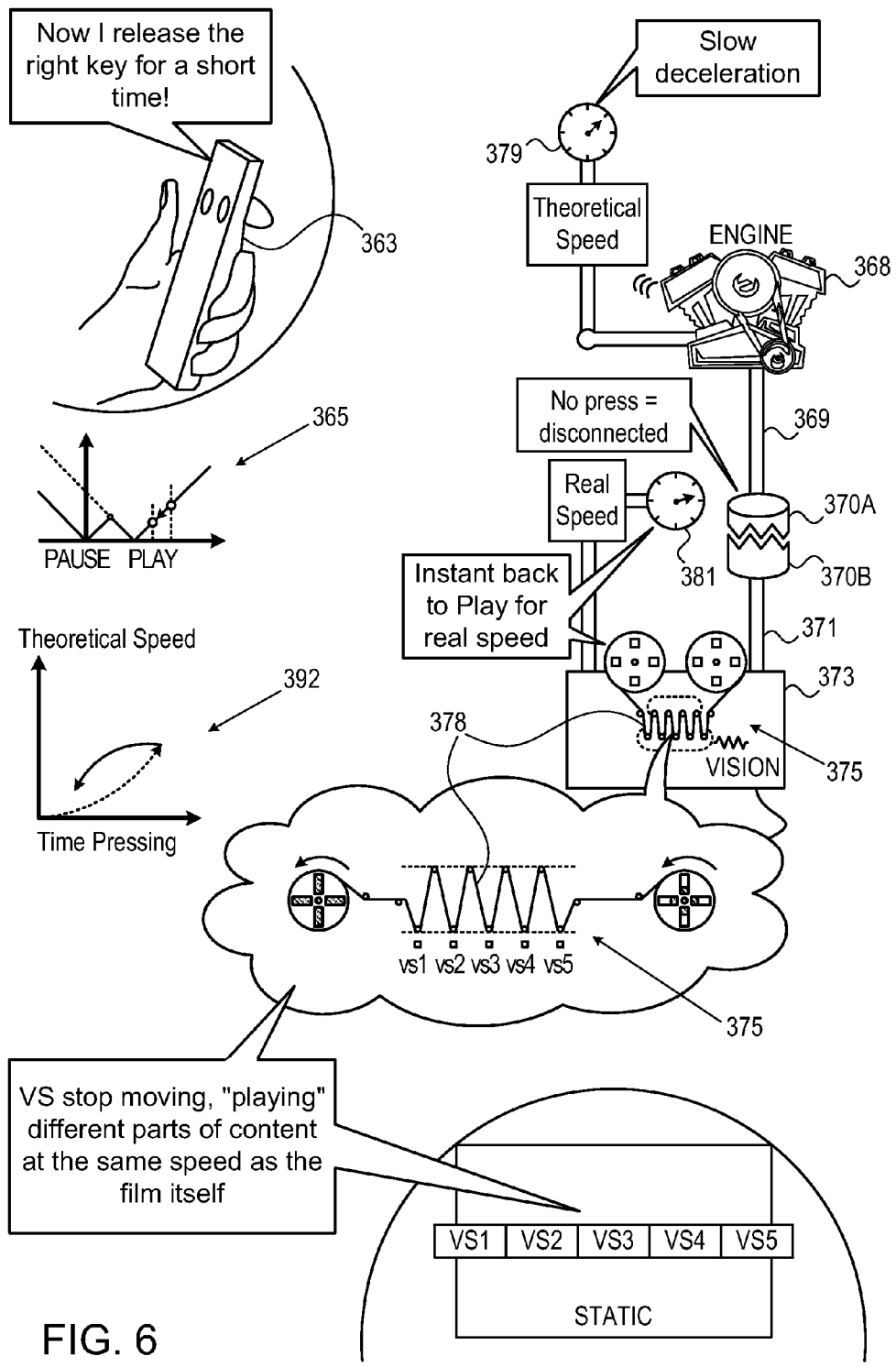

Referring now to the metaphoric depiction of FIG. 6, the user holding the remote control 363 is depicted as having briefly released the right oriented control. The effect of briefly releasing the right oriented control is to end the slow acceleration, and to slowly decelerate back to regular play speed.

A detail of a potential curve 365 is depicted, detailing how the video file being viewed can be modeled as if the video file were a ball moving on a gravitational potential curve. The behavior of the potential curve is described below.

The trick play engine 368 is depicted in FIG. 6 as turning a shaft 369. Shaft 369 is attached to the interlocking gear mechanism 370A and 370B. As is the case in FIG. 4, because the right oriented control has been released, the depiction in FIG. 6 depicts the trick play the trick play "engine" 368 having the interlocking gears 370A and 370B disengaged.

Since the interlocking gears 370A and 370B are now disengaged, the rate at which the trick play engine 368 turns shaft 369 has no effect on the video playback speed, as explained below.

The sinusoid curve 378 is now gradually returning to the same state in which the sinusoid curve 378 of FIG. 4 is depicted as being.

Likewise, the speedometer 379 which shows the theoretical speed of the video is depicted as indicating slow deceleration, and the second speedometer 381, which indicates the playback speed, are depicted as reflecting that the video has returned back to play mode, video playback speed (1×).

As the gears 370A, 370B are disengaged, the speed of the additional video streams VS1, VS2, . . . , VS5, is "static". That is to say, the additional video streams VS1, VS2, . . . , VS5 progress at regular video playback speed without any trick mode playback.

A hysteresis graph 392 depicting the relationship between the theoretical speed of the video streams VS1, VS2, . . . , VS5 and the time engaged in pressing the right oriented control of the remote control 363. The hysteresis graph 392 is explained below in greater detail with reference to FIGS. 15-18.

Figure 7:
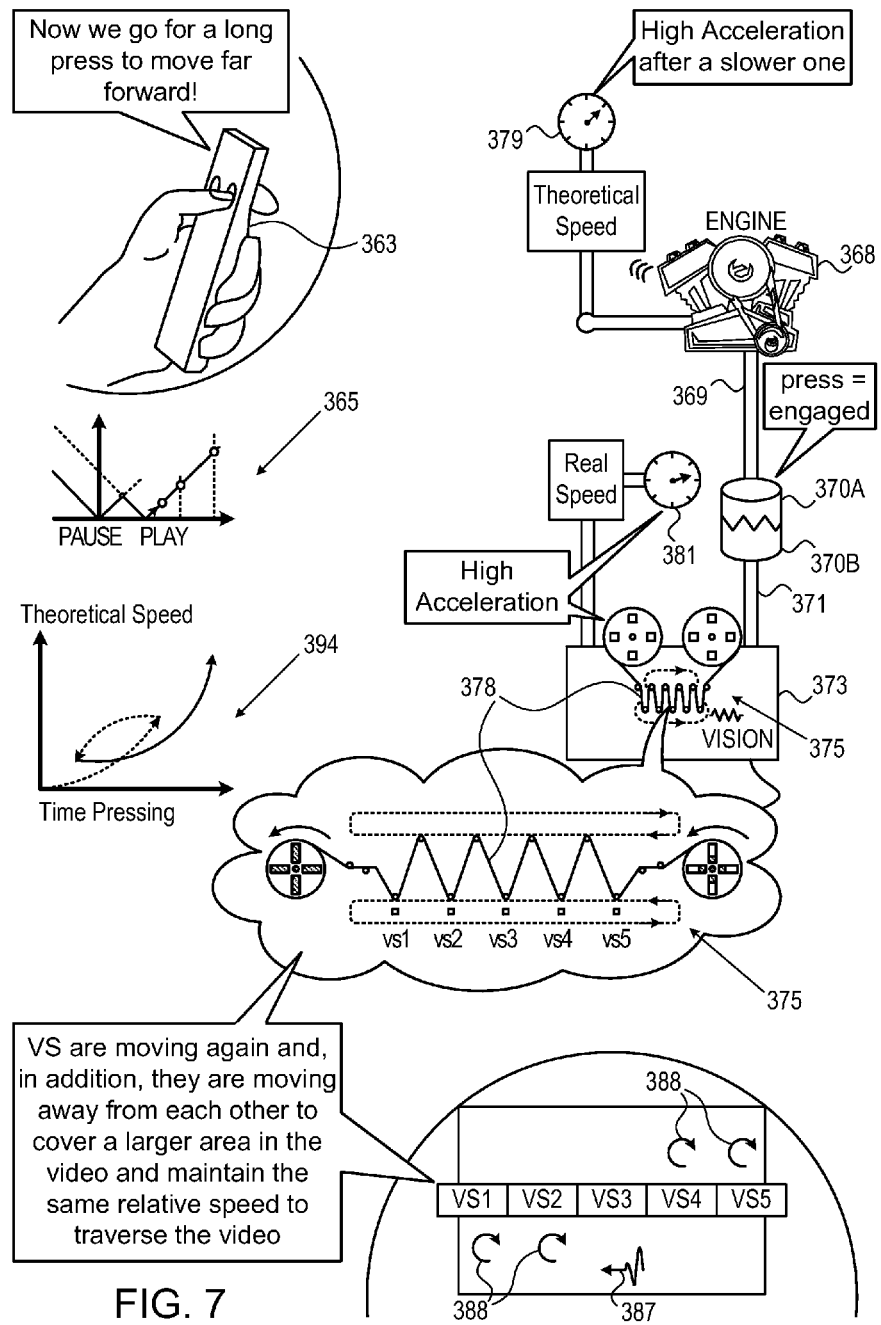

Turning now to FIG. 7, the user holding the remote control 363 is depicted pressing on the right oriented control. It is noted that in the metaphoric depiction of FIG. 7, the press on the right oriented control is a long, extended, press. The effect of the long press on the right oriented control is to move the video far forward.

A detail of a potential curve 365 is depicted, detailing how the video file being viewed can be modeled as if the video file were a ball moving on a gravitational potential curve. The behavior of the potential curve during fast forward is described below, with reference to FIG. 19.

The trick play engine 368 is depicted in FIG. 5 as turning a shaft 369. Shaft 369 is attached to the interlocking gear mechanism 370A and 370B. By contrast with FIGS. 4 and 6, the depiction in FIG. 7 is of the system of FIG. 1 in "fast forward trick play" mode. Thus, the trick play the trick play "engine" 368 is depicted having the interlocking gears 370A and 370B engaged.

Since the interlocking gears 370A and 370B are now engaged, the rate at which the trick play engine 368 turns shaft 369 has an effect on the video playback speed, as explained below. The curve 387 indicates that video stream VS3 is moving smoothly forward in the direction of trick play. The circular arrows 388 indicate that the video streams VS1, VS2, VS4, and VS5 are regularly updating, appearing to "jump" to a new position at regular intervals, as the video position of VS3 smoothly progresses. Circular arrows are used throughout the figures in order to indicate that a video associated with the circular arrow is regularly updating, and thus, appears to "jump" to a new position at regular intervals.

The sinusoid curve 378 is now depicted in a state where the various video streams VS1, VS2, . . . , VS5 are moving. Since the various video streams VS1, VS2, . . . , VS5 are moving and accelerating rapidly, the video streams VS1, VS2, . . . , VS5 move away from each other in order to cover a larger amount of the video file while maintaining the same relative speed in order to traverse the video file. In order to stress that the video streams VS1, VS2, . . . , VS5 move away from each other, the sinusoid curve 378 is depicted with peaks and troughs further from each other than the peaks and troughs in sinusoid curve 378 depicted in FIGS. 4, 5 and 6.

Accordingly, the trick play engine 368 speedometer 379 and the projection unit 373 speedometer 381 are both depicted indicating high acceleration of video speed.

A hysteresis graph 394 depicting the relationship between the theoretical speed of the video streams VS1, VS2, . . . , VS5 and the time engaged in pressing the right oriented control of the remote control 363. The hysteresis graph 390 is explained below in greater detail with reference to FIGS. 15-18.

Figure 8:
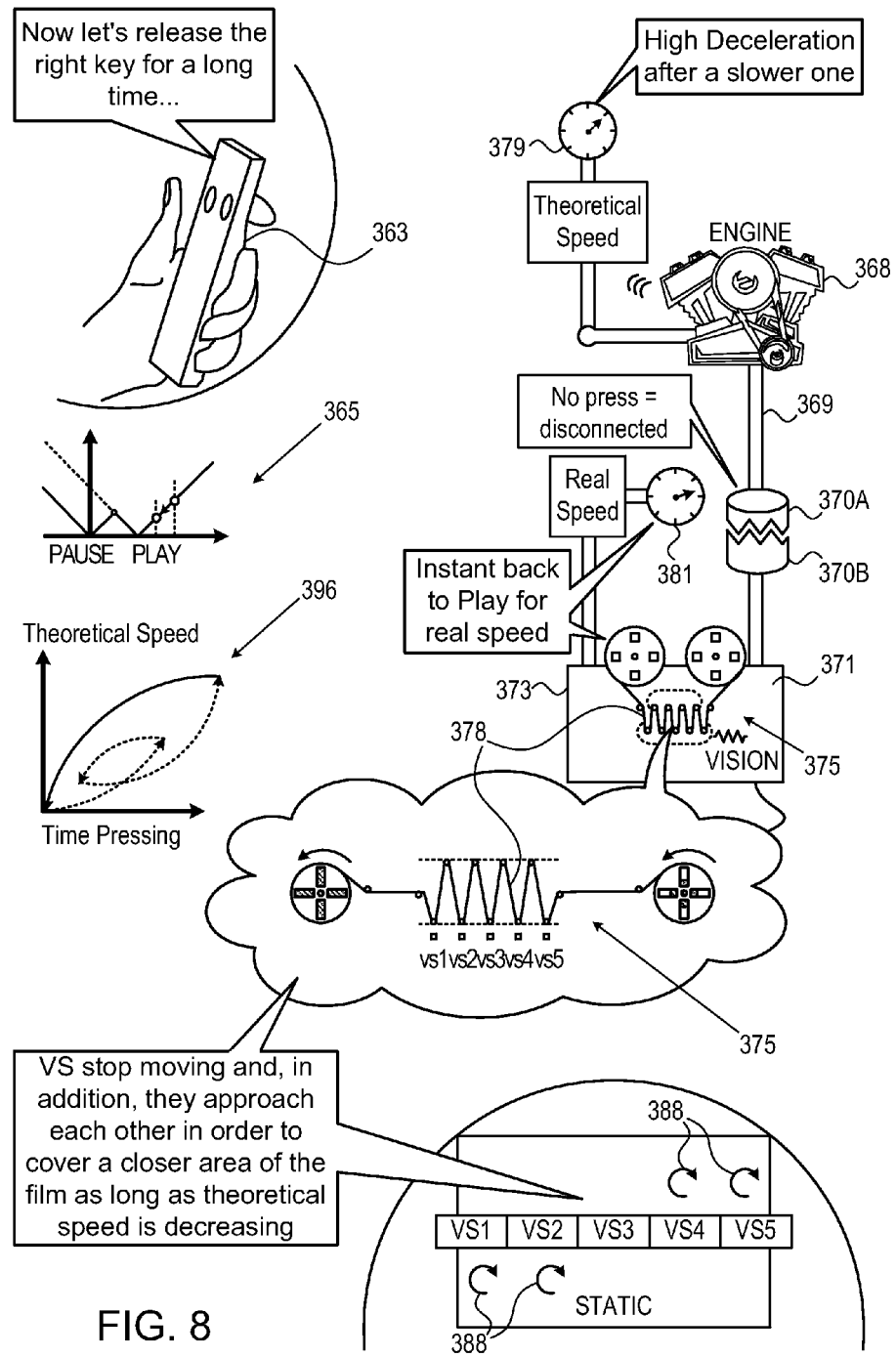

Turning now to FIG. 8, the user holding the remote control 363 is depicted as having released the right oriented control. The effect of releasing the right oriented control is to end the acceleration of FIG. 7, and, at first to slowly decelerate back to regular play speed, and after an amount of time has passed, to rapidly decelerate back to play mode.

A detail of a potential curve 365 is depicted, detailing how the video file being viewed can be modeled as if the video file were a ball moving on a gravitational potential curve. The behavior of the potential curve is described below.

The trick play engine 368 is depicted in FIG. 6 as turning a shaft 369. Shaft 369 is attached to the interlocking gear mechanism 370A and 370B. As is the case in FIG. 4, because the right oriented control has been released, the depiction in FIG. 8 depicts the trick play the trick play "engine" 368 having the interlocking gears 370A and 370B disengaged.

Since the interlocking gears 370A and 370B are now disengaged, the rate at which the trick play engine 368 turns shaft 369 has no effect on the video playback speed, as explained below.

The sinusoid curve 378 is now depicted as returning to the same state in which the sinusoid curve 378 of FIG. 4 is depicted as being. However, in order to stress that the video streams VS1, VS2, . . . , VS5 are approaching one another, the sinusoid curve 378 is depicted with peaks and troughs closer to each other than the peaks and troughs in sinusoid curve 378 depicted in FIGS. 4, 5 and 6.

Likewise, the speedometer 379 which shows the theoretical speed of the video is depicted as indicating slow deceleration, and the second speedometer 381, which indicates the playback speed, are depicted as reflecting that the video are returning to play mode, video playback speed (1×).

As the gears 370A, 370B are disengaged, the speed of the additional video streams VS1, VS2, . . . , VS5, is "static". That is to say, the additional video streams VS1, VS2, . . . , VS5 are decelerating to regular video playback speed without any trick mode playback. As such, the video streams are approaching each other as deceleration (the theoretical speed decreases) occurs.

A hysteresis graph 396 depicting the relationship between the theoretical speed of the video streams VS1, VS2, . . . , VS5 and the time engaged in pressing the right oriented control of the remote control 363. The hysteresis graph 396 is explained below with reference to FIGS. 15-18.

The operation of the system FIG. 1 is now described, with reference to FIGS. 9-29.

Figure 9:
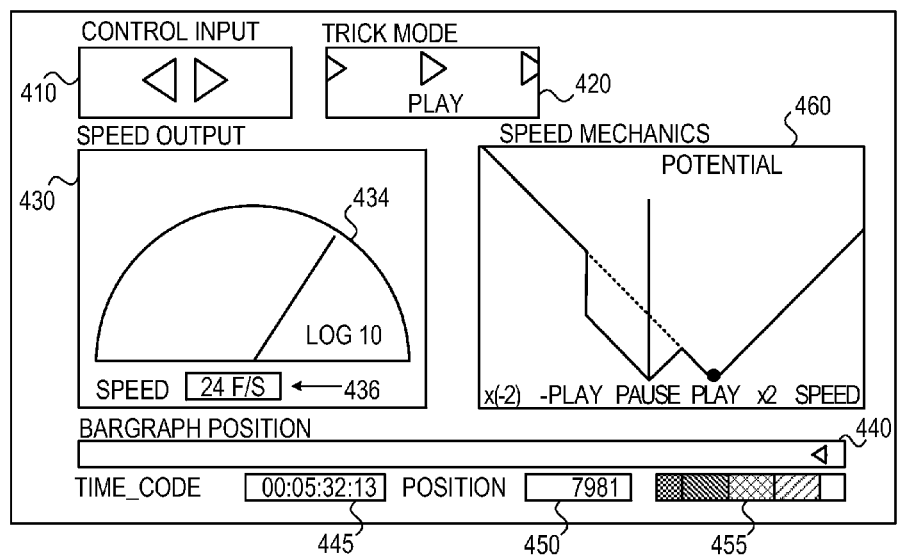
FIG. 9 is a depiction of the trick mode system engine of FIG. 1 in Play mode.

Reference is now made to FIG. 9, which is a depiction of the trick mode system engine 400 of FIG. 1 in Play mode. It is instructional to observe the system of FIG. 1 in a play mode in order to better appreciate the operation of the system in trick mode operation.

An indicator 410 graphically depicts a menu of options available from the user interface device. In the example depicted in FIG. 9, since the system is in play mode, both fast forward and rewind are available options, and so, both arrows to the right and left are depicted. None of the depicted arrows in FIG. 9 are depicted as selected (see, by contrast, FIGS. 19 and 20).

A second indicator 420 graphically depicts a trick mode state of the system. In the example depicted in FIG. 9, the system is in play mode. As mentioned above, for ease of description, the discussion of the operation of the system of FIG. 1 begins with a discussion of the system in play mode.

A speed indicator 430 both graphically 434 and textually 436 shows the speed of the displayed video. In the present example, during regular play back of the video, the video speed is indicated as being a typical video speed of 24 frames per second (PAL). Were the description of the system of FIG. 1 to describe operation in an NTSC environment, the video speed would be 30 frames per second (NTSC).

A bar graph indicator 440 graphically indicates the position of the presently displayed frame relative to the entire length of the video. Likewise, a time code 445 (displayed, as is standard in the art as hh:mm:ss:ff—hours, minutes, seconds, and frames) is indicated. A position indicator 450 indicates a frame number of the frame which is presently being displayed. Five colored bands 455 appear in the figure which indicate the positions in the video file 210 (FIG. 2) of frames corresponding to the multiplicity of thumb nail video frames 110a, 110b, 110c, 110d, 110e (FIG. 1) which are displayed on the user interface 100 (FIG. 1)

A speed mechanics indicator 460 graphically depicts a "mechanical" link between a speed of the video file 110 (FIG. 1) to a "potential", according to which the video file behaves. Specifically, in embodiments of the present invention, the speed and direction in which the video file is played out is related to as a gravitational force on a ball.

Figure 10:
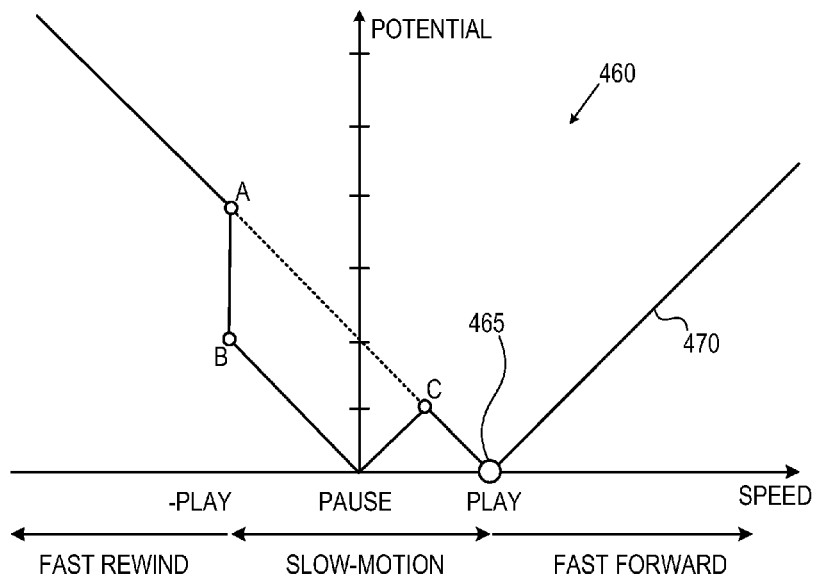
FIG. 10 depicts a detail of the potential curve of FIG. 9.

Reference is now additionally made to FIG. 10, which depicts a detail of the potential curve of FIG. 9. As mentioned above, the video file is related to as if the video file a ball 465. It is appreciated that in the discussion of FIG. 10 and throughout the present description, comparing the video file to a ball is by way of a metaphor—the video file is not a physical ball. Nonetheless, in describing certain embodiments of the present invention, it is useful to model the behavior of the video file as if the video file were a ball moving on a gravitational potential curve 470.

The ball is depicted in FIGS. 9 and 10 at a position of lowest gravitational potential, or more specifically, at the vortex of two rays of an angle on the curve 470 depicted in the speed mechanics indicator 460 (FIG. 9).

The gravitational potential curve 470 of FIG. 10 depicts how the speed of navigation in the video file 110 (FIG. 1) is "mechanically" linked, as if by a vertical projection, to the position of the ball 465. The ball 465 can slide along the gravitational potential curve 470 by:

a. being "pushed up" by actuating a user interface device, such as, but not limited to a key press, the key press causing the video file playback speed to increase, having the effect of making the ball 465 speed up along the curve towards a higher point on the gravitational potential curve 470; and b. "falling" down with gravitational acceleration to the lowest point along the gravitational potential curve 470.

A fracture is depicted between points A and B on the gravitational potential curve 470. The fracture causes the ball 465 to:

fall into play mode from any point on the gravitational potential curve 470 higher than point A (e.g. return to play after a long rewind); and fall into pause from any point lower than point B (e.g. back to pause from a slow rewind).

Additional effects of the fracture are that the ball 465 cannot slide up from C to A without passing through point B, wherefrom the ball 465 instantly jumps to point A while sliding up the gravitational potential curve 470.

In order to change high speed direction (e.g. from fast forward to fast rewind, or vica-versa), actuating a user interface device, such as, and without limiting the generality of the foregoing, pressing the first directional oriented control (for example and without limiting the generality of the foregoing, left) from fast forward or pressing the second directional oriented control (for example and without limiting the generality of the foregoing, right) from fast rewind switches the speed to its opposite value (i.e. a mirror effect around pause).

Table 1, below, summarizes behavior of the ball 465 as a function of user interface device commands and an initial position of the ball 465. It is appreciated in Table 1 that the commands "left" and "right" are given by way of example only, and are to be understood in a more general fashion, as actuating the first directional oriented control or pressing the second directional oriented control.

TABLE 1

| COMMAND | BALL INITIAL POSITION | | | | | |
|---|---|---|---|---|---|---|
| | Rewind-A | A-C | B-Pause | Pause-C | C-Play | Play-Forward |
| None | Falls to play | Falls to pause | Falls to pause | Falls to pause | Falls to play | Falls to play |
| Left | Pushed left | Pushed left | Pushed left | Falls to pause | Pushed left | Jumps to position Rewind-A with opposite speed |
| Right | Jumps to position Play-Forward with opposite speed | Falls to play | Falls to pause | Pushed right | Falls to play | Pushed right |

Figure 11:
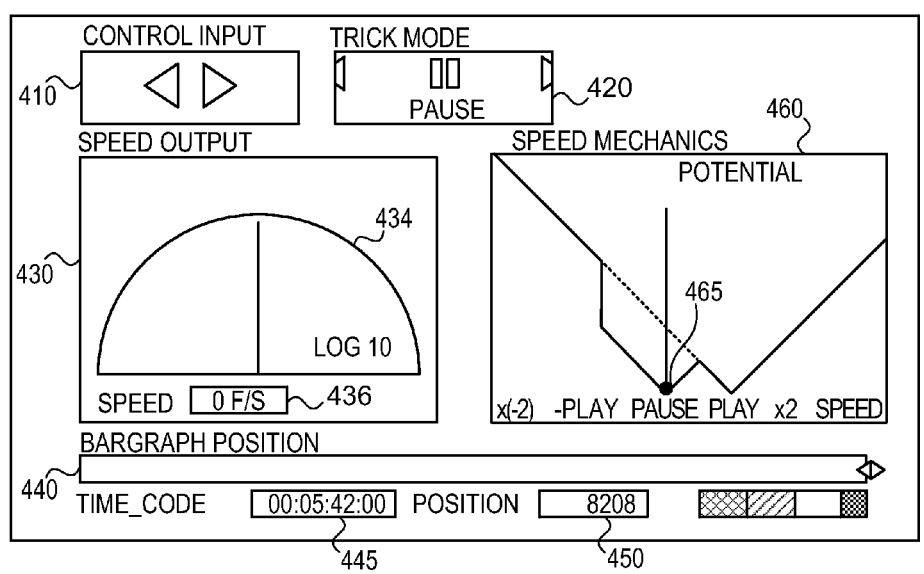
FIG. 11 is a depiction of the trick mode system engine of FIG. 1 in Pause mode.

Reference is now made to FIG. 11, which is a depiction of the trick mode system engine 400 of FIG. 1 in Pause mode.

In the depiction of the trick mode system engine 400, the second indicator 420 graphically depicts that the system is in pause mode. The discussion of the operation of the system of FIG. 1 now continues, in light of the discussion of FIGS. 9 and 10 with a discussion of the system in pause mode.

The speed indicator 430 both graphically 434 and textually 436 shows the speed of the displayed video. In the present example, during pause mode, the video speed is indicated as being 0 (zero) frames per second.

The speed mechanics indicator 460 graphically depicts that the ball 465 has fallen into the pause position.

Figure 12:
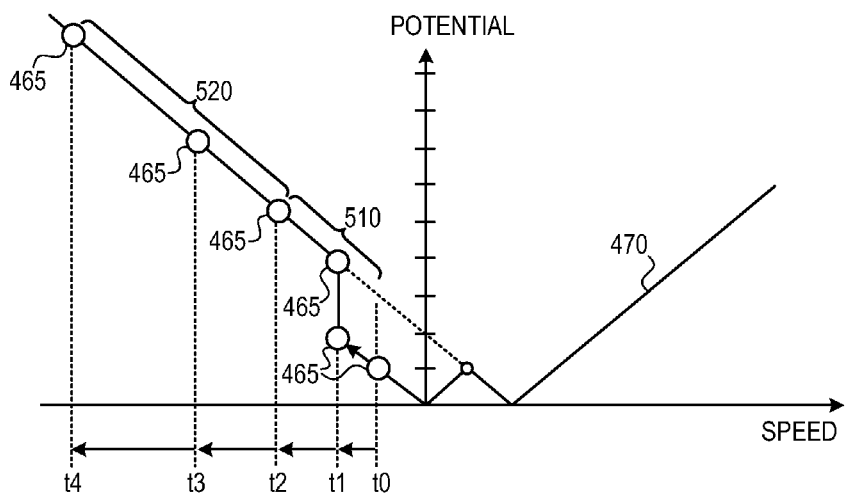
FIG. 12 is a depiction of the ball of FIG. 10 being pushed in rewind.

Reference is now made to FIG. 12, which is a depiction of the ball 465 of FIG. 10 being pushed in rewind. Pushing the ball 465 means applying a continuous force that makes the ball 465 ascends in a non-linear progression (acceleration) along the curve 470, and consequently along the speed axis.

The position of the pushed ball 465 on a straight curve along time is mathematically determined by:

$$\text{Position}(t) = \text{Initial Position } t0 \pm Kp \cdot t^2$$

Kp is a constant which is adjusted to be specific to a given video system. Continuing with the mechanical metaphor discussed above in describing FIG. 10, $Kp = \frac{1}{2} \cdot F/m$ where F is the Force applied to the ball (pressure on the actuated remote control device) and m the mass of the ball.

A time slice 510 between t0 and t2 comprises the time that enables the user to adjust the progression of the ball 465 (i.e. the video file 110 of FIG. 1) to an expected speed and a time slice 520 between t2 and t4 is the time that enables the user to quickly reach as high a rewind speed as expected or desired.

Figure 13:
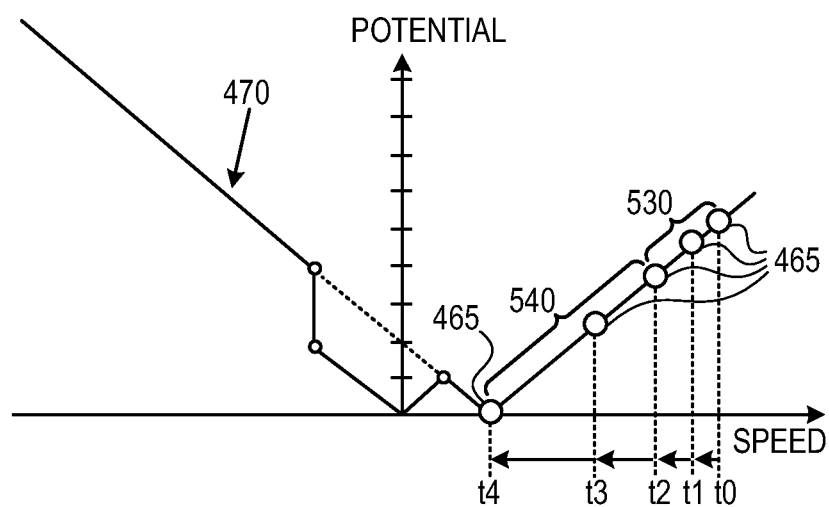
FIG. 13 is a depiction of the ball of FIG. 10 falling into play.

Reference is now made to FIG. 13, which is a depiction of the ball 465 of FIG. 10 falling into play. Falling down with the acceleration of gravity means that the ball 465 descends in a non-linear progression along the curve 470, and consequently along the speed axis.

The position of the falling ball on a straight curve along time is mathematically determined by:

$$\text{Position}(t) = \text{Initial } t0 \text{ Position} +/- Kf \cdot t^2$$

Kf is a constant which is adjusted to be specific to a given video system. Continuing with the mechanical metaphor discussed above in describing FIG. 10, $Kf = \frac{1}{2} \cdot [\sin(\alpha) \cdot G/m]$ where G is the Force of gravity, m the mass of the ball, and a the angle of the curve with respect to the horizontal (speed) axis.

A time slice 530 between t0 and t2 comprises the time that enables the user to maintain a constant fast forward speed and a time slice 540 between t2 and t4 comprises the time that enables to the ball 465 quickly fall back in Play.

It is appreciated that video speed is limited in rewind and fast forward, the speed limit depending on the length of the video file, in order to enable reaching the beginning or the end of the video sequence in approximately a given minimum time. If t is the minimum time expected to reach the end of the video file and length the duration of the video, then the limit of the speed is determined mathematically by:

$$\text{Limit} = \text{length} \cdot 24/t$$

assuming that the video playout speed is 24 frames/second. It is appreciated that in NTSC systems, Limit=length*30/t. The following examples are given using 24 frames/second. It is appreciated that substituting 30 frames/second instead of 24 frames/second is a simple arithmetic matter.

For example, if t equals 20 seconds (that is to say, there is a minimum time 20 seconds required to reach the end of the video file) and length equals 2 hours of video (as in, say, a movie), then the speed limit is 2 hours*60 minutes/hour*60 seconds/minute*24 frames/second÷20 seconds=8640 frames/second. This speed corresponds to play ×360 (i.e. at a regular playout speed of 24 frames/second, 8640 frames/second=360 times the regular playout speed).

Likewise, if t equals 20 seconds (that is to say, there is a minimum time 20 seconds required to reach the end of the video file) and length equals 3 minutes of video (as in, say, a video clip), then speed limit is 3 minutes*60 seconds/minute*24 frames/second÷20 seconds=216 frames/second. This speed corresponds to play×9 (i.e. at a regular playout speed of 24 frames/second, 216 frames/second=9 times the regular playout speed).

Figure 14:
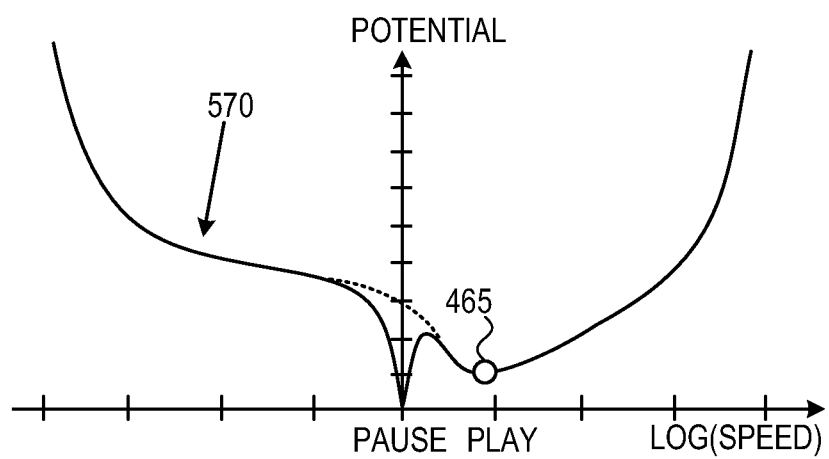
FIG. 14 is a depiction of an alternative embodiment of the gravitational potential curve of FIG. 10.

Reference is now made to FIG. 14, which is a depiction of an alternative embodiment of the gravitational potential curve 470 of FIG. 10. Those skilled in the art will appreciate that other gravitational potential curves may be substituted for the gravitational potential curve 470 of FIG. 10. For example and without limiting the generality of the foregoing, gravitational potential curve 570, which is a more sophisticated gravitational potential curve may be used in conjunction with the system of FIG. 1. It is appreciated that curve 570 possesses a logarithmic non-linear scaling, and thus, has higher limits around the pause and play vortices, as the ball 465 stops at a higher point on the curve than in the linear scale depicted in FIGS. 12 and 13.

Reference is now made to FIGS. 15-18, which are various hysteresis curves showing the relationship between the time spent operating a control button and trick play speed in the operation of the system of FIG. 1.

Figure 15:
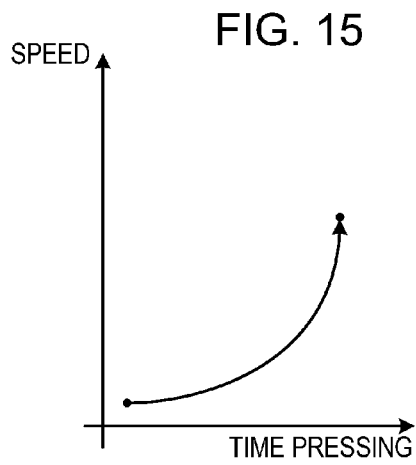
FIGS. 15-18 are various hysteresis curves showing the relationship between time spent operating a control button and trick play speed in the operation of the system of FIG. 1.

Referring specifically to FIG. 15, a user of the system of FIG. 1 is pressing the right oriented control on the remote control 363 (see FIG. 7). If the right oriented control is released early on during the pressing, the ball 465 (FIG. 10) falls rapidly back into play mode. However, if the right oriented control key is depressed for a long amount of time, the ball 465 (FIG. 10) is quickly accelerated to maximum trick mode speed.

Figure 16:
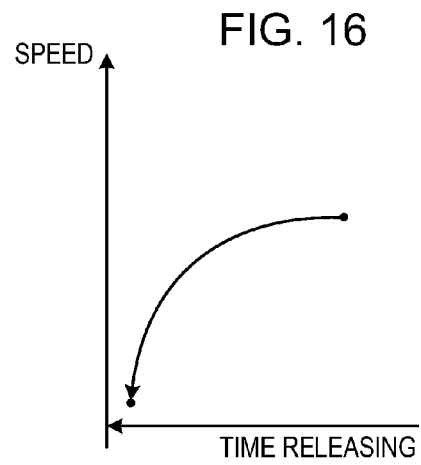

Referring specifically to FIG. 16, the user of the system of FIG. 1 has released, for a prolonged amount of time, the right oriented control on the remote control 363 (see FIG. 8). If the right oriented control is released early on after the right oriented control on the remote control 363 (see FIG. 8) has been released, the ball 465 (FIG. 10) accelerates rapidly to maximum trick mode speed. However, if the right oriented control key is released for a long amount of time, the ball 465 (FIG. 10) falls rapidly back into play mode.

Figure 17:
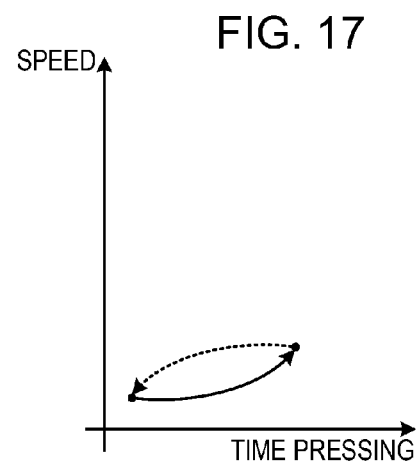

Referring specifically to FIG. 17, a user of the system of FIG. 1 is pressing the right oriented control on the remote control 363 (see FIG. 6) for a brief amount of time. As was noted with reference to FIG. 15, if the right oriented control is released early on during the pressing, the ball 465 (FIG. 10) falls rapidly back into play mode. Accordingly, the system of FIG. 1 acquires only a low speed. Before rapid acceleration occurs, in FIG. 17, the right oriented control is released, and the ball 465 (FIG. 10) falls rapidly back into play mode, as is indicated by the curve depicted with the dashed lines.

Figure 18:
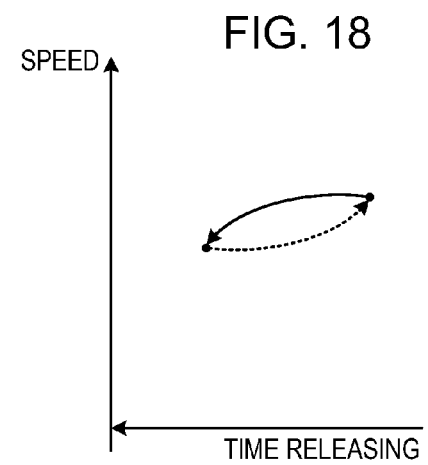

Referring specifically to FIG. 18, a user of the system of FIG. 1 releases the right oriented control on the remote control 363 (see FIG. 8) for a long time, after a prolonged press of the right oriented control on the remote control 363. The system of FIG. 1 initially maintains a rapid velocity. Before rapid deceleration occurs, however, the user presses the right oriented control again, and the system returns to the rapid acceleration, as is indicated by the curve depicted with the dashed lines.

Figure 19:
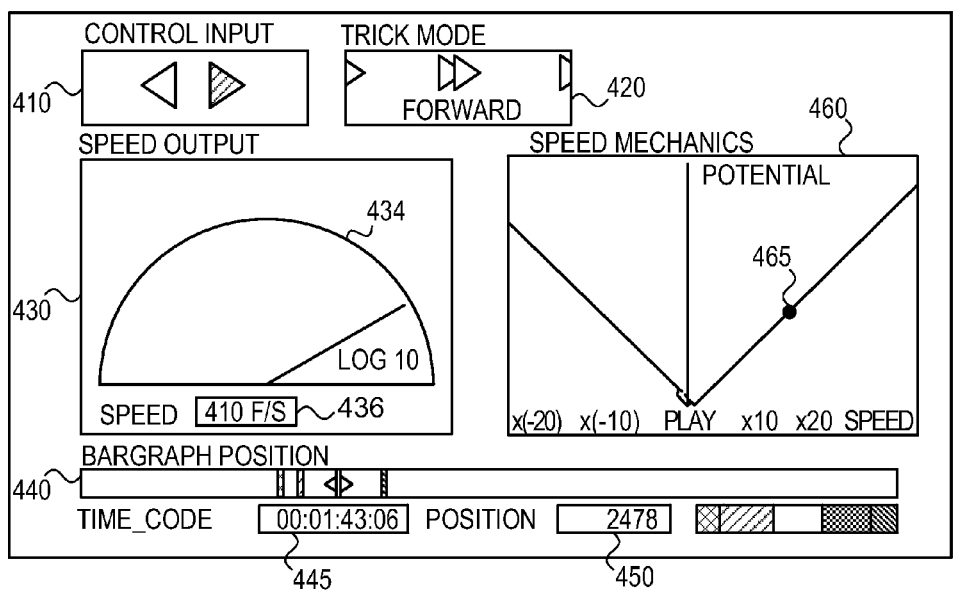
FIG. 19 is a depiction of a fast forward operation in the trick mode system engine of FIG. 1.
Figure 20:
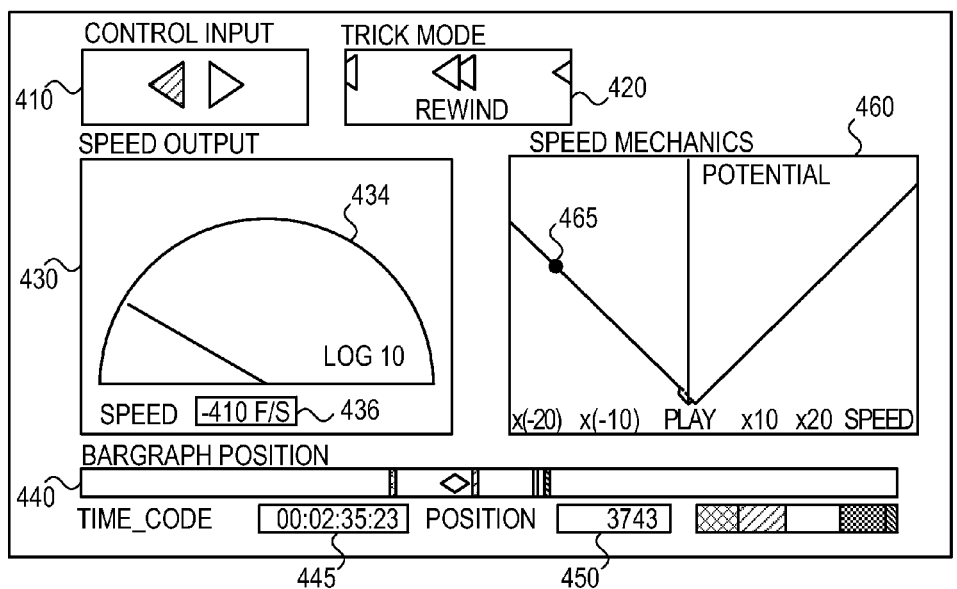
FIG. 20 is a depiction of a rewind operation in the trick mode system engine of FIG. 1.

Reference is now made to FIG. 19, which is a depiction of the fast forward operation in the trick mode system engine 400 of FIG. 1 and reference is additionally made to FIG. 20, which is a depiction of the rewind operation in the trick mode system engine 400 of FIG. 1.

In the depiction of the trick mode system engine 400, the second indicator 420 graphically depicts that the system is in fast forward mode (FIG. 19) or in rewind mode (FIG. 20).

The speed indicator 430 both graphically 434 and textually 436 shows the speed of the displayed video. In the present example, in fast forward mode (FIG. 19), the video speed is depicted as being 410 frames per second. In rewind mode (FIG. 20), the video speed is depicted as being −410 frames per second.

The speed mechanics indicator 460 graphically depicts that the ball 465 is accelerating in the positive direction (FIG. 19) or the negative direction (FIG. 20).

Figure 21:
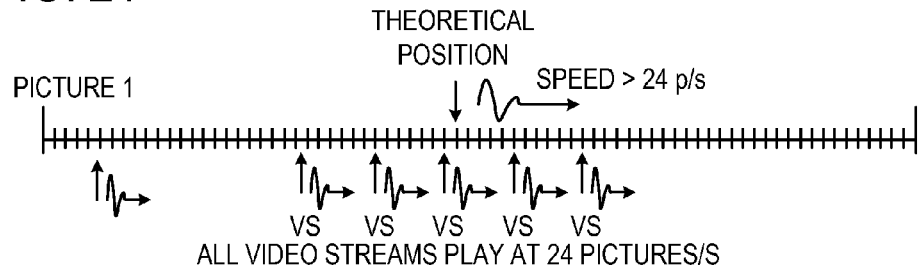
FIG. 21 is a depiction of a video streams position model for use in the system of FIG. 1.

Reference is now made to FIG. 21, which is a depiction of a video streams position model for use in the system of FIG. 1. As depicted in FIG. 1, embodiments of the present invention select different positions in the video file to play in different video streams 110*a-e* (FIG. 1) in fast forward and fast rewind and sliding at the same relative speed when actuating the control on the user interface device, for instance, and without limiting the generality if the foregoing, actuating the first directional oriented control the second directional oriented control. Pressing the various direction keys causes showing video further away from the present position of the video at high speed and video closer to the present position of the video at lower speeds.

The video file comprises N frames beginning with frame 1 and progressing to frame N.

A video stream typically plays out one frame at a time, typically showing 24 frames per second (PAL), or 30 frames/second (NTSC) at non-fast forward or rewind speeds.

The speed of navigation (i.e. fast forward speed or rewind speed) in the video file is defined by a number of frames "overtaken" (i.e. not shown) per second and is driven by the "speed curve" (i.e. the gravitational potential curve 470 of FIG. 10) as discussed above.

A theoretical position in the video file is the frame theoretically reached by starting from the last frame showed in Play or Pause and by overtaking future or previous frames according to:

the speed of navigation when actuating the control on the user interface device (for example and without limiting the generality of the foregoing, when a left key or a right key is pressed) (engaged mode); and 24 frames/second (PAL), or 30 frames/second (NTSC), when actuating the control on the user interface device (for example and without limiting the generality of the foregoing, when a left key or a right key is pressed) (disconnected).

As depicted in FIG. 1, the user in fast forward or fast rewind speed is presented a view of a multiplicity of video frames 110*a*, 110*b*, 110*c*, 110*d*, 110*e*. The multiplicity of video frames 110*a*, 110*b*, 110*c*, 110*d*, 110*e* play the video file at various fast-forward and fast-rewind speeds, centering around the theoretical position.

The distance between two consecutive video streams (for example 110*b* and 110*c*; or 110*a* and 110*d*; or 110*c* and 110*a*) comprises a number of frames between respective positions of the two video frames. The distance between two consecutive video streams is also directly related to a time needed by the first video stream to catch-up the second video stream, if the second video stream were to stop. In such a case, the time for the first stream to catch up with the second stream would be:

Time (in seconds)=24×Distance (number of frames)

(It is noted that in an NTSC system, the above formula would be:

Time (in seconds)=30×Distance (number of frames)).

Figure 22:
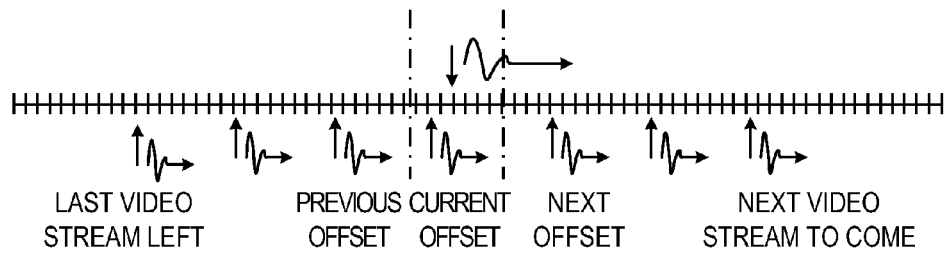
FIG. 22 is an illustration showing an offset position in the system of FIG. 1.

Reference is now made to FIG. 22, which is an illustration showing an offset position in the system of FIG. 1. In light of the discussion of FIG. 21, The offset position is the position of the video stream closest to the theoretical position and which is the midpoint of the remaining video (i.e., half the video is positioned before the offset position, and half the video is positioned after the offset position).

Figure 23:
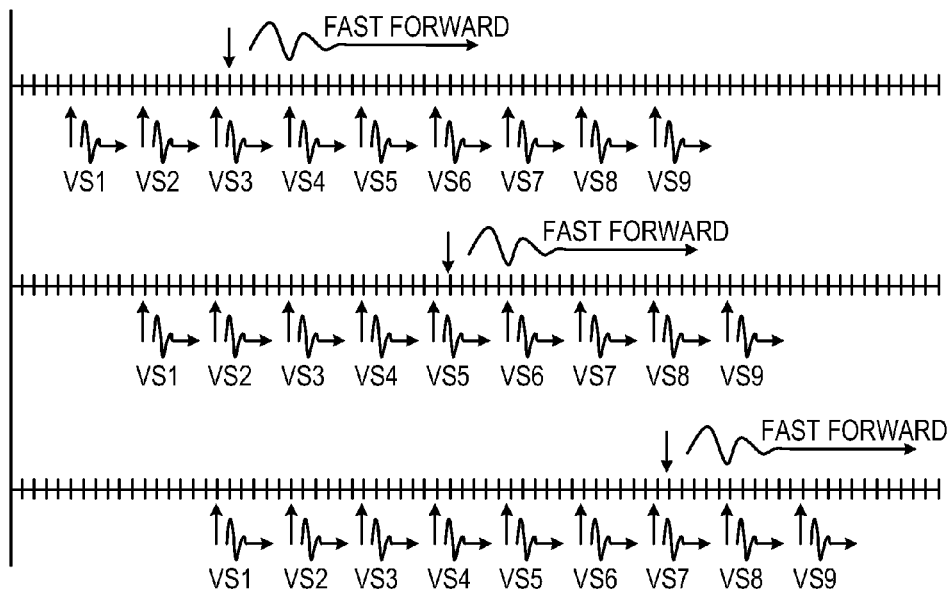
FIG. 23 is an illustration depicting how the offset position changes while a theoretical position overtakes one of the video streams positions in the system of FIG. 1.

Reference is now made to FIG. 23, which is an illustration depicting how the offset position changes while a theoretical position overtakes one of the video streams positions in the system of FIG. 1. It is appreciated that the positions in the video file of the different video streams displayed (depicted as VS1, VS2, ..., VS9) depend on the theoretical position (that defines the offset position) and the video speed (that defines the distance between positions). It is appreciated that FIG. 23 depicts a situation wherein the offset position is changing while the theoretical position "overtakes" video streams positions (engaged mode).

Figure 24:
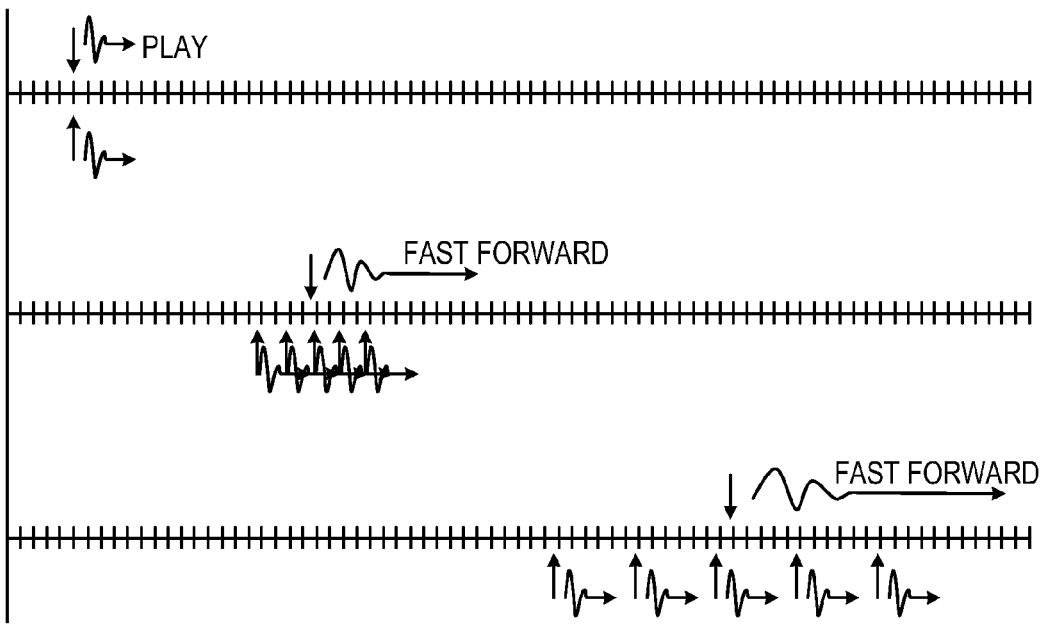
FIG. 24 is a depiction of how distance between video positions increases as trick mode speed increases in the system of FIG. 1.

Reference is now made to FIG. 24, which is a depiction of how distance between video positions increases as trick mode speed increases in the system of FIG. 1. FIG. 24 depicts a situation where the distance between positions is increasing while the speed is increasing (engaged mode).

Theoretically, with n video streams visible at a time and t, the time during which one video stream is visible, the distance between two successive positions in the video is given (for PAL systems) by:

Distance=[(speed−24)×x$t$]/($n$−1)

It is appreciated that in NTSC systems, the distance is given by:

Distance=[(speed−30)×$t$]/($n$−1).

For example, and without limiting the generality of the foregoing, in a PAL system, if there are 5 video streams visible at a time and each video stream is visible during 4 seconds (time being positioned relative to the offset position), then the distance between positions is:

1 frame (1/24$^{th}$ of a second) at 25 frames/second speed (a bit more than regular PAL play speed);
24 frames (1 second) at 48 frames/second speed (i.e. play× 2);
2 minutes at play×128;
and so forth.

However, it is appreciated that while speed can change continuously, the distance between two separate video streams cannot change continuously. If the distance between two separate video streams were to change continuously, then, PAL video streams would have to exceed the typical play back rate of 24 frames/second. Likewise, NTSC video streams would have to exceed the typical play back rate of 30 frames/second.

Figure 25:
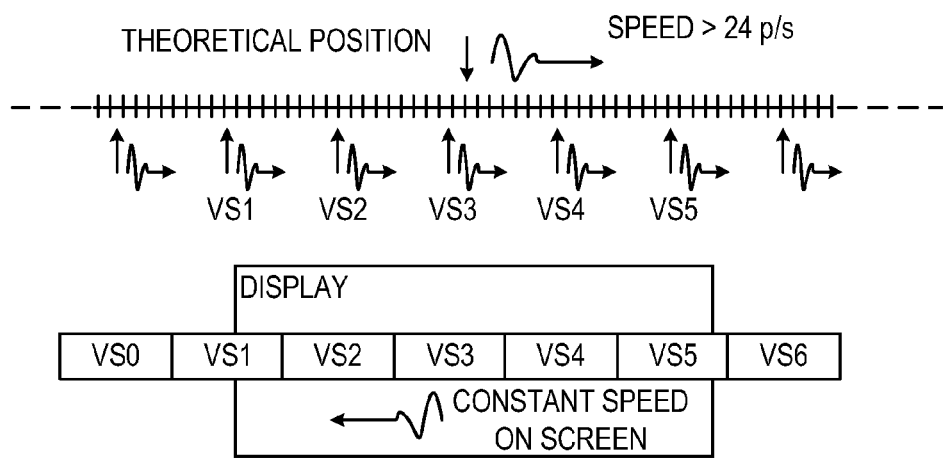
FIG. 25 is a depiction of video streams sliding at constant speed in engaged mode in the system of FIG. 1.

Reference is now made to FIG. 25 which is a depiction of video streams sliding at constant speed in engaged mode in the system of FIG. 1.

When operating in engaged mode, the theoretical position moves at the speed of video navigation and all of the video streams are progressing at the same speed when displayed on the screen.

It is appreciated that in FIG. 25, video stream 5 (VS5) is depicted as having just replaced VS0, and VS 6 is depicted as being about to replace VS1.

Figure 26:
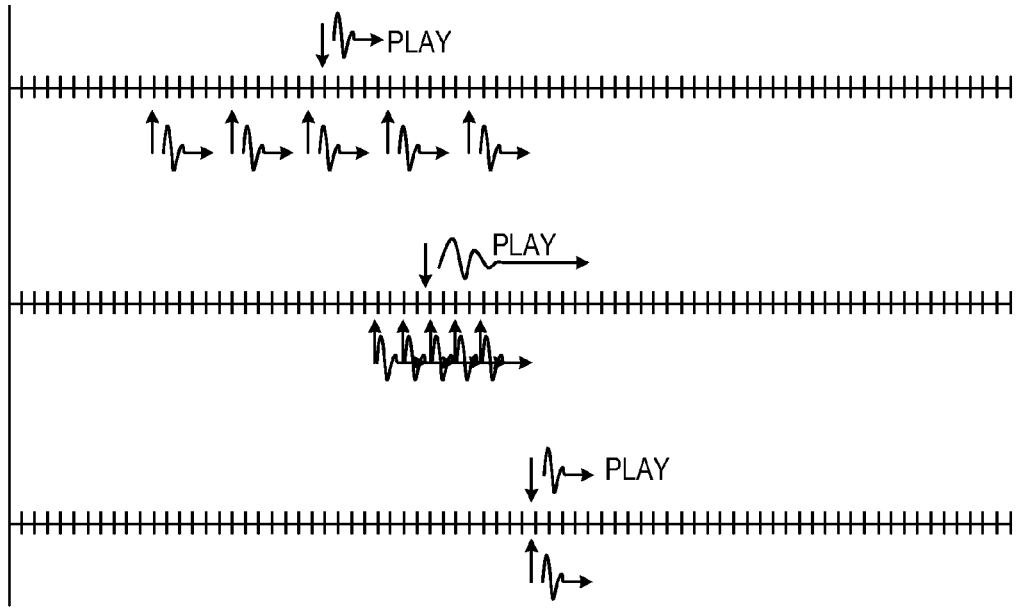
FIG. 26 is a depiction of how distance between video positions decreases and the theoretical position moves in Play mode in the system of FIG. 1.

Reference is made to FIG. 26, which is a depiction of how distance between video positions decreases and the theoretical position moves in Play mode in the system of FIG. 1.

With n video streams visible at a time and t, the time during which one video stream is visible, a new video stream has to be introduced every r seconds, and an old video stream has to be removed every r seconds, where:

τ=$t$/($n$−1)

Accordingly, every τ seconds, a new video stream replaces the oldest displayed video stream (refer to FIG. 25, where VS5 has just replaced VS0, and VS6 is about to replace VS1). When the new video stream replaces the oldest displayed video stream, the new video stream appears with a position that maintains both the correct distance and the correct offset position:

Position=Theoretical position+/−($n$−1)×Distance/2

When operating in disconnected mode, the theoretical position is moving at 24 frames/second in PAL systems, and at 30 frames/second in NTSC systems. Thus, the theoretical position stays in the middle of the video streams that are no longer displayed on screen as moving.

Figure 27:
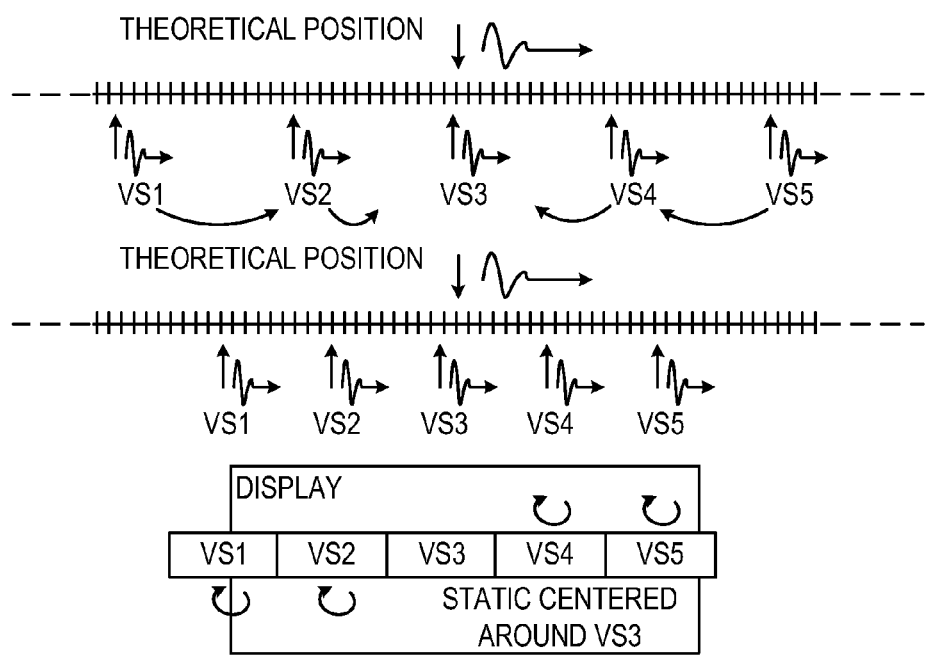
FIG. 27 is a depiction of static video streams in disconnected mode in the system of FIG. 1.

Reference is now made to FIG. 27, which is a depiction of static video streams in disconnected mode in the system of FIG. 1

As depicted in FIG. 27, each video stream is regularly updated with a jump to a new frame in the video file played in the video stream. That is to say that each video stream regularly moves to a new theoretical position (i.e. a new frame in the video file) as the video file is either played out in regular playback mode or as the video moves in trick mode. Accordingly, every r seconds, video streams are updated and correct jumps are calculated to reflect the new distances around VS3 and reflecting to the trick mode speed. It is appreciated that when the video is in play mode, neither the video itself nor the video streams move.

Figure 28:
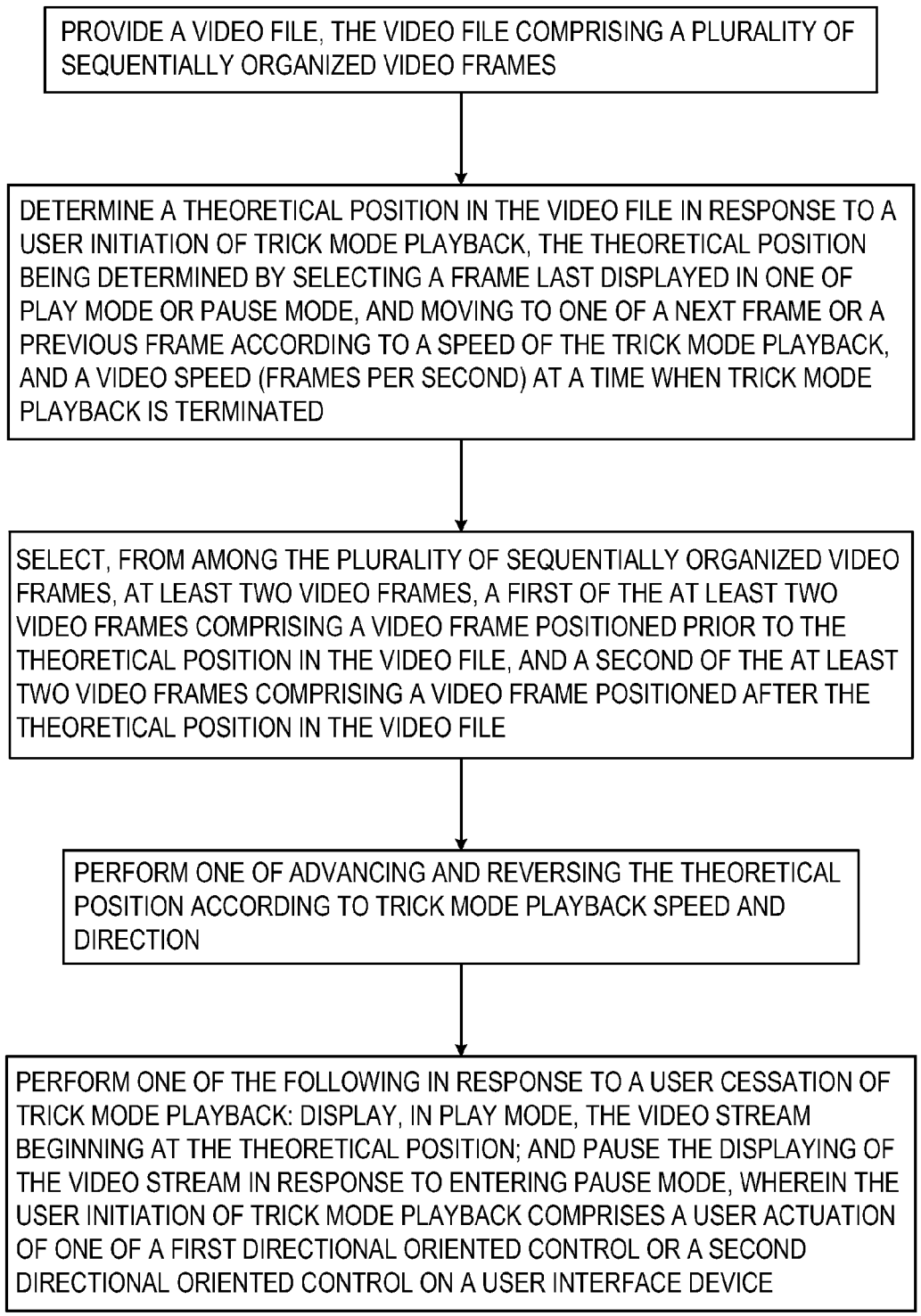
FIGS. 28-29 are simplified flowcharts of methods of operation of the system of FIG. 1.
Figure 29:
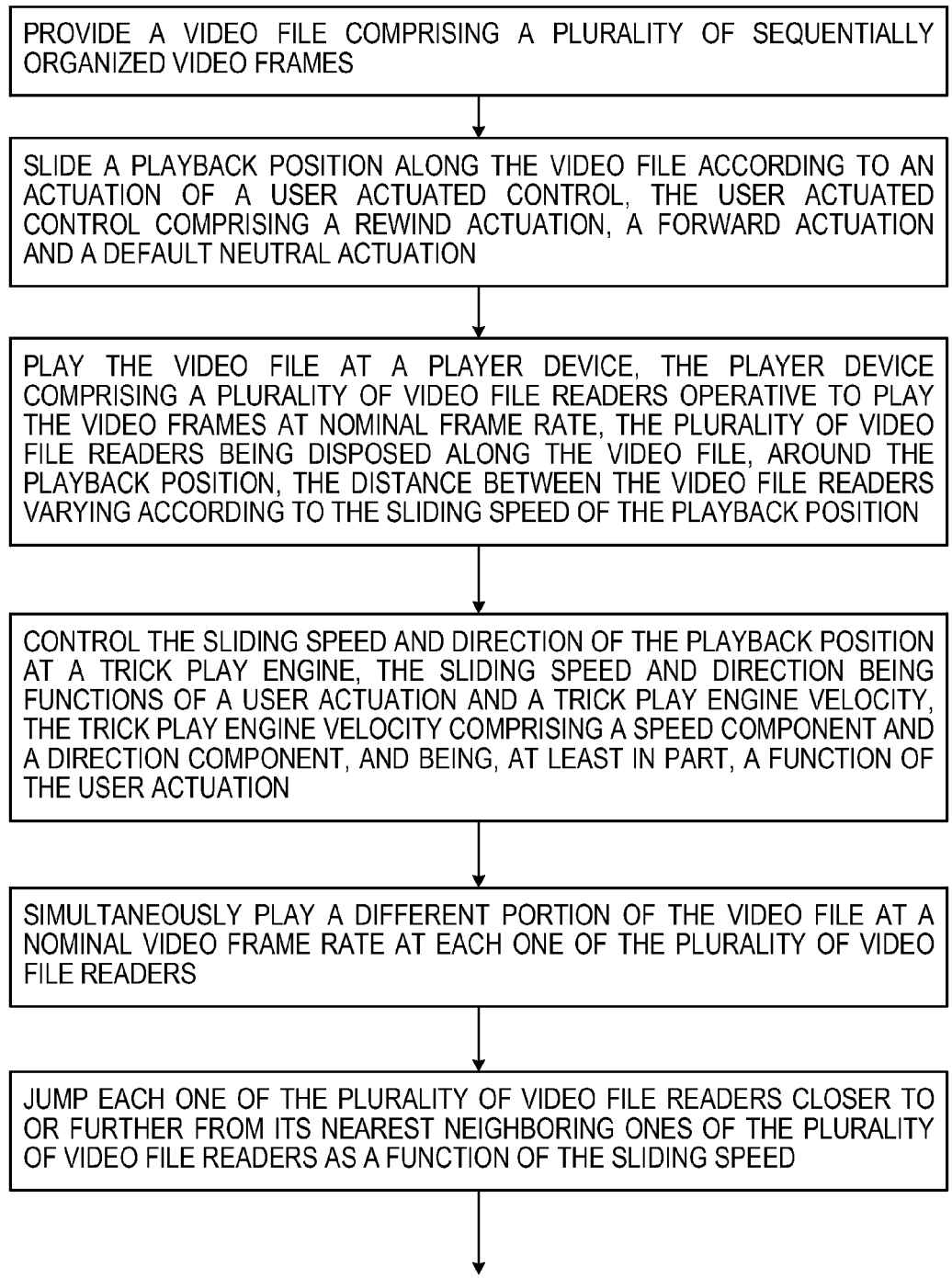

Reference is now made to FIGS. 28-29 which are simplified flowcharts of methods of operation of the system of FIG. 1. FIGS. 28-29 are believed to be self-explanatory in light of the above discussion.

It is appreciated that software components of the present invention may, if desired, be implemented in ROM (read only memory) form. The software components may, generally, be implemented in hardware, if desired, using conventional techniques. It is further appreciated that the software components may be instantiated, for example: as a computer program product; on a tangible medium; or as a signal interpretable by an appropriate computer.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined by the appended claims and equivalents thereof:

The invention claimed is:

1. A system for video trick mode playback, the system comprising:
  a video file comprising a plurality of sequentially organized video frames;
  a user actuated control operative to slide a playback position along the video file, the user actuated control comprising a rewind actuation, a forward actuation and a default neutral actuation;
  a player device comprising a plurality of video file readers operative to play the video frames at nominal frame rate, the plurality of video file readers being disposed along the video file, around the playback position, the distance between the video file readers varying according to the sliding speed of the playback position;
  a trick play engine to control the sliding speed and direction of the playback position, the sliding speed and direction being functions of a user actuation and a trick play engine velocity, the trick play engine velocity comprising a speed component and a direction component, and being, at least in part, a function of the user actuation;

each one of the plurality of video file readers simultaneously plays a different portion of the video file at a nominal video frame rate;

each one of the plurality of video file readers jumps closer to or further from its nearest neighboring ones of the plurality of video file readers as a function of the sliding speed;

the position at which each one of the plurality of video file readers is disposed along the video file is updated to catch-up with the playback position when the playback position is not sliding forward at nominal frame rate, and according to the following rule:

if the sliding speed is greater than the nominal video frame rate and the sliding direction is forward, the position of the most delayed video reading head changes to make it the most advanced video reading head; and if either one or both of one of the sliding speed is less than the nominal video frame rate; and the sliding direction is rewind, the position of the most advanced video reading head changes to make it the most delayed video reading head, wherein:

in one of a forward or rewind actuation of the user actuated control, the sliding speed and direction of the playback position are the same as the velocity speed component and direction components;

in a neutral actuation of the user actuated control, if the velocity speed component is greater than the nominal video frame rate during one of: fast rewind; and fast forward, then the sliding speed is the same as the nominal video frame rate and the sliding direction is forward; and in a neutral actuation of the user actuated control, if the velocity speed component is less than the nominal video frame rate during one of: pause; slow motion rewind; and slow motion forward, then the sliding speed and direction of the playback position are the same as the velocity speed component and direction components.

2. The system according to claim 1 and also comprising a display upon which is displayed each of the different portions of the video file played by each one of the plurality of video file readers, wherein different portions of the video file are displayed in separate windows such that:

the windows are displayed along the display in the same order as the positions of their associated video file readers along the video file; and the windows move along the screen like their associated video file readers move relatively to the sliding playback position in the video file.

3. The system according to claim 1 and wherein the nominal video frame rate is one of: 24 frames per second; and 30 frames per second.

4. The system according to claim 1 and wherein the velocity corresponds to a vertical projection of a moving ball's position along a gravitational potential curve, the gravitational potential curve comprising a first dip corresponding to nominal video frame rate and a second dip comprising a video frame rate of zero frames per second, wherein the first dip corresponds to play mode and the second dip corresponds to pause mode.

5. The system according to claim 4 and wherein a neutral actuation of the user actuated control results in the ball falling according to gravitational acceleration along the gravitational potential curve.

6. The system according to claim 4 and wherein when the velocity speed component is greater than the nominal video frame rate, actuating the control in a direction opposite to the direction component of the velocity switches the direction component of the velocity to its opposite direction and disposes the ball on the corresponding position on the gravitational curve.

7. The system according to claim 4 and wherein, the gravitational potential curve further comprises an alternative path bridging the second dip, thereby allowing the ball to avoid falling into the second dip, and fall, into the first dip instead, when the ball falls from a point of high gravimetric potential on the gravitational potential curve.

8. The system according to claim 7 and wherein a neutral actuation of the user actuated control results in the ball falling according to gravitational acceleration along the alternative path along the gravitational potential curve, if the velocity speed component is greater than the nominal video frame rate, and the direction component of the velocity comprises a rewind direction.

9. The system according to claim 4 and wherein when the user actuated control is actuated in one of a forward or rewind actuation along the direction in which the curve is rising, the ball is pushed and ascends in a non-linear progression along the curve.

10. The system according to claim 9 and wherein when the direction component of the velocity comprises a forward direction and the velocity decelerates, a forward actuation of the user control accelerates the velocity.

11. The system according to claim 9 and wherein when the direction component of the velocity comprises a rewind direction and the velocity decelerates, a rewind actuation of the user control accelerates the velocity.

12. A method for video trick mode playback, the method comprising:

providing a video file comprising a plurality of sequentially organized video frames;

sliding a playback position along the video file according to an actuation of a user actuated control, the user actuated control comprising a rewind actuation, a forward actuation and a default neutral actuation;

playing the video file at a player device, the player device comprising a plurality of video file readers operative to play the video frames at nominal frame rate, the plurality of video file readers being disposed along the video file, around the playback position, the distance between the video file readers varying according to the sliding speed of the playback position;

controlling the sliding speed and direction of the playback position at a trick play engine, the sliding speed and direction being functions of a user actuation and a trick play engine velocity, the trick play engine velocity comprising a speed component and a direction component, and being, at least in part, a function of the user actuation;

simultaneously playing a different portion of the video file at a nominal video frame rate at each one of the plurality of video file readers;

jumping each one of the plurality of video file readers closer to or further from its nearest neighboring ones of the plurality of video file readers as a function of the sliding speed;

updating the position at which each one of the plurality of video file readers is disposed along the video file thereby catching-up with the playback position when the playback position is not sliding forward at nominal frame rate, and according to the following rule:
- if the sliding speed is greater than the nominal video frame rate and the sliding direction is forward, the position of the most delayed video reading head changes to make it the most advanced video reading head; and
- if either one or both of one of the sliding speed is less than the nominal video frame rate; and the sliding direction is rewind, the position of the most advanced video reading head changes to make it the most delayed video reading head, wherein:
- in one of a forward or rewind actuation of the user actuated control, the sliding speed and direction of the playback position are the same as the velocity speed component and direction components;
- in a neutral actuation of the user actuated control, if the velocity speed component is greater than the nominal video frame rate during one of: fast rewind; and fast forward, then the sliding speed is the same as the nominal video frame rate and the sliding direction is forward; and
- in a neutral actuation of the user actuated control, if the velocity speed component is less than the nominal video frame rate during one of: pause; slow motion rewind; and slow motion forward, then the sliding speed and direction of the playback position are the same as the velocity speed component and direction components.

13. A system for video trick mode playback, the system comprising:
- means for providing a video file comprising a plurality of sequentially organized video frames;
- means for sliding a playback position along the video file according to an actuation of a user actuated control, the user actuated control comprising a rewind actuation, a forward actuation and a default neutral actuation;
- means for playing the video file at a player device, the player device comprising a plurality of video file readers operative to play the video frames at nominal frame rate, the plurality of video file readers being disposed along the video file, around the playback position, the distance between the video file readers varying according to the sliding speed of the playback position;
- means for controlling the sliding speed and direction of the playback position at a trick play engine, the sliding speed and direction being functions of a user actuation and a trick play engine velocity, the trick play engine velocity comprising a speed component and a direction component, and being, at least in part, a function of the user actuation;
- means for simultaneously playing a different portion of the video file at a nominal video frame rate at each one of the plurality of video file readers;
- means for jumping each one of the plurality of video file readers closer to or further from its nearest neighboring ones of the plurality of video file readers as a function of the sliding speed;
- means for updating the position at which each one of the plurality of video file readers is disposed along the video file thereby catching-up with the playback position when the playback position is not sliding forward at nominal frame rate, and according to the following rule:
  - if the sliding speed is greater than the nominal video frame rate and the sliding direction is forward, the position of the most delayed video reading head changes to make it the most advanced video reading head; and
  - if either one or both of one of the sliding speed is less than the nominal video frame rate; and the sliding direction is rewind, the position of the most advanced video reading head changes to make it the most delayed video reading head, wherein:
- in one of a forward or rewind actuation of the user actuated control, the sliding speed and direction of the playback position are the same as the velocity speed component and direction components;
- in a neutral actuation of the user actuated control, if the velocity speed component is greater than the nominal video frame rate during one of: fast rewind; and fast forward, then the sliding speed is the same as the nominal video frame rate and the sliding direction is forward; and
- in a neutral actuation of the user actuated control, if the velocity speed component is less than the nominal video frame rate during one of: pause; slow motion rewind; and slow motion forward, then the sliding speed and direction of the playback position are the same as the velocity speed component and direction components.

* * * * *

UNITED STATES PATENT AND TRADEMARK OFFICE
CERTIFICATE OF CORRECTION

PATENT NO. : 8,958,687 B2  
APPLICATION NO. : 13/577321  
DATED : February 17, 2015  
INVENTOR(S) : Chauvier et al.

Page 1 of 1

It is certified that error appears in the above-identified patent and that said Letters Patent is hereby corrected as shown below:

In the Specification

In column 19, line 21, delete "Distance=[(speed-24)××t]/(n-1)" and substitute therefor --Distance = [(speed – 24) × t]/(n – 1)--;

In column 19, line 60, delete "every r" and substitute therefor --every τ--;

In column 19, line 61, delete "every r" and substitute therefor --every τ--;

In column 20, line 20, delete "every r" and substitute therefor --every τ--.

Signed and Sealed this  
Fifth Day of May, 2015

Michelle K. Lee  
*Director of the United States Patent and Trademark Office*